US012045573B2

United States Patent
Jindal et al.

(10) Patent No.: US 12,045,573 B2
(45) Date of Patent: Jul. 23, 2024

(54) DETERMINING SEMANTIC RELATIONSHIPS OF ARGUMENT LABELS

(71) Applicant: International Business Machines Corporation, Armonk, NY (US)

(72) Inventors: Ishan Jindal, San Jose, CA (US); Yunyao Li, San Jose, CA (US); Siddhartha Brahma, San Jose, CA (US); Huaiyu Zhu, Fremont, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 371 days.

(21) Appl. No.: 17/452,646

(22) Filed: Oct. 28, 2021

(65) Prior Publication Data

US 2023/0135140 A1 May 4, 2023

(51) Int. Cl.
*G06F 40/30* (2020.01)
*G06N 20/00* (2019.01)

(52) U.S. Cl.
CPC .............. *G06F 40/30* (2020.01); *G06N 20/00* (2019.01)

(58) Field of Classification Search
CPC ....................................................... G06F 40/30
USPC ............................................................. 704/9
See application file for complete search history.

(56) References Cited

U.S. PATENT DOCUMENTS

| 10,509,814 B2 | 12/2019 | Diaz et al. |
| 10,977,445 B2 | 4/2021 | Yu et al. |
| 2016/0179945 A1 * | 6/2016 | Lastra Diaz .......... G06F 16/284 707/739 |
| 2021/0097384 A1 | 4/2021 | Jain et al. |
| 2021/0248323 A1 * | 8/2021 | Maheshwari ........ G06V 30/416 |

FOREIGN PATENT DOCUMENTS

| CN | 105229725 A * | 1/2016 | ............. G06N 3/045 |
| WO | WO-2020247616 A1 * | 12/2020 | ........... G06F 40/216 |

OTHER PUBLICATIONS

VD. W. Otter, J. R. Medina and J. K. Kalita, "A Survey of the Usages of Deep Learning for Natural Language Processing," in IEEE Transactions on Neural Networks and Learning Systems, vol. 32, No. 2, pp. 604-624, Feb. 2021, doi: 10.1109/TNNLS.2020. 2979670. (Year: 2021).*

(Continued)

*Primary Examiner* — Bharatkumar S Shah
(74) *Attorney, Agent, or Firm* — Amin, Turocy & Watson, LLP

(57) ABSTRACT

One or more systems, devices, computer program products and/or computer-implemented methods of use provided herein relate to regularizing semantic similarity relationships relative to a pair of languages. A system can comprise a memory that stores computer executable components, and a processor that executes the computer executable components stored in the memory, wherein the computer executable components comprise a computation component that generates a transformation comprising a semantic similarity relationship between detected semantic labels of a pair of languages.

20 Claims, 14 Drawing Sheets

(56) References Cited

OTHER PUBLICATIONS

J. R. Medina and J. K. Kalita, "A Survey of the Usages of Deep Learning for Natural Language Processing," in IEEE Transactions on Neural Networks and Learning Systems, vol. 32, No. 2, pp. 604-624, Feb. 2021, doi: 10.1109/TNNLS .2020.2979670. (Year: 2021) (Year: 2021).*
Akbik et al., "Towards Semi-Automatic Generation of Proposition Banks for Low-Resource Languages", Proceedings of the 2016 Conference on Empirical Methods in Natural Language Processing, 2016, pp. 993-998.
Ammar et al., "Many languages, One Parser", Transactions of the Association for Computational Linguistics, vol. 4, 2016, pp. 431-444.
Cai et al., "A Full End-to-End Semantic Role Labeler, Syntax-agnostic Over Syntax-aware?", Proceedings of the 27th International Conference on Computational Linguistics, Aug. 20-26, 2018, pp. 2753-2765.
Conneau et al., "Word Translation Without Parallel Data", arXiv preprint arXiv:1710.04087, Jan. 30, 2018, 14 pages.
Devlin et al., "BERT: Pre-training of Deep Bidirectional Transformers for Language Understanding", Proceedings of the 2019 Conference of the North American Chapter of the Association for Computational Linguistics: Human Language Technologies, vol. 1 (Long and Short Papers), 2019, pp. 4171-4186.
Hajič et al., "The CoNLL-2009 Shared Task: Syntactic and Semantic Dependencies in Multiple Languages", Proceedings of the Thirteenth Conference on Computational Natural Language Learning: Shared Task, Association for Computational Linguistics, 2009, pp. 1-18.
Hajič et al., "PDT-VALLEX: Creating a Large-coverage Valency Lexicon for Treebank Annotation", Proceedings of the second workshop on treebanks and linguistic theories, vol. 9, 2003, pp. 57-68.
Marcheggiani et al., "A Simple and Accurate Syntax-Agnostic Neural Model for Dependency-based Semantic Role Labeling", Proceedings of the 21st Conference on Computational Natural Language Learning (CONLL 2017), 2017, pp. 411-420.
He et al., "Jointly Predicting Predicates and Arguments in Neural Semantic Role Labeling", Proceedings of the 56th Annual Meeting of the Association for Computational Linguistics, vol. 2, 2018, pp. 364-369.
Marcheggiani et al., "Encoding sentences with graph convolutional networks for semantic role labeling" Proceedings of the 2017 Conference on Empirical Methods in Natural Language Processing, 2017, pp. 1506-1515.
He et al., "Deep semantic role labeling: What works and what's next", Proceedings of the 55th Annual Meeting of the Association for Computational Linguistics, vol. 1, 2017, pp. 473-483.
Mulcaire et al., "Polyglot contextual representations improve crosslingual transfer", Proceedings of the 2019 Conference of the North American Chapter of the Association for Computational Linguistics: Human Language Technologies, vol. 1, 2019, pp. 3912-3918.
Hochreiter et al., "Long short-term memory", Neural computation, vol. 9, No. 8, pp. 1735-1780.
Joulin et al., "Loss in translation: Learning bilingual word mapping with a retrieval criterion", Proceedings of the 2018 Conference on Empirical Methods in Natural Language Processing, 2018, 8 pages.
Pražák et al., "Crosslingual srl based upon universal dependencies", RANLP, 2017, pp. 592-600.
Kasai et al., "Syntax-aware neural semantic role labeling with supertags", Proceedings of the 2019 Conference of the North American Chapter of the Association for Computational Linguistics: Human Language Technologies, vol. 1, 2019, pp. 701-709.
Punyakanok et al., "The importance of syntactic parsing and inference in semantic role labeling", Computational Linguistics, vol. 34, No. 2, 2018, pp. 257-287.
Roth et al., "Neural semantic role labeling with dependency path embeddings", Proceedings of the 54th Annual Meeting of the Association for Computational Linguistics, vol. 1: Long Papers, 2016, pp. 1192-1202.
Kingma et al., "Adam: A method for stochastic optimization", arXiv preprint arXiv:1412.6980, 2014, 15 pages.
Shi et al., "Knowledge-based semantic embedding for machine translation", Proceedings of the 54th Annual Meeting of the Association for Computational Linguistics, vol. 1, 2016, pp. 2245-2254.
Kiperwasser et al., "Simple and accurate dependency parsing using bidirectional LSTM feature representations", Transactions of the Association for Computational Linguistics, vol. 4, 2016, pp. 313-327.
Srivastava et al., "Training Very Deep Networks", Advances in neural information processing systems, 2015, pp. 2377-2385.
Li et al., "A Unified Syntax-aware Framework for Semantic Role Labeling", Proceedings of the 2018 Conference on Empirical Methods in Natural Language Processing, 2018, pp. 2401-2411.
Strubell et al., "Linguistically-informed self-attention for semantic role labeling", Proceedings of the 2018 Conference on Empirical Methods in Natural Language Processing, 2018, pp. 5027-5038.
Maqsud et al., "Nerdle: Topic-specific question answering using wikia seeds", Proceedings of COLING 2014, the 25th International Conference on Computational Linguistics: System Demonstrations, 2014, pp. 81-85.
Tan et al., "Deep semantic role labeling with self-attention", The Thirty-Second AAAI Conference on Artificial Intelligence (AAAI-18), 2018, 8 pages.
Taulé et al., "AnCora: Multilevel Annotated Corpora for Catalan and Spanish", Proceedings of the Sixth International Conference on Language Resources and Evaluation (LREC'08), May 2008, 6 pages.
Xie et al., "Neural Cross-Lingual Named Entity Recognition with Minimal Resources", Proceedings of the 2018 Conference on Empirical Methods in Natural Language Processing, Oct. 31-Nov. 4, 2018, pp. 369-379.
Yih et al., "The value of semantic parse labeling for knowledge base question answering", Proceedings of the 54th Annual Meeting of the Association for Computational Linguistics, vol. 2, Aug. 7-12, 2016, pp. 201-206.
Zhao et al., "Multilingual dependency learning: Exploiting rich features for tagging syntactic and semantic dependencies", Proceedings of the Thirteenth Conference on Computational Natural Language Learning: Shared Task, Association for Computational Linguistics, Jun. 2009, pp. 61-66.
Zhao et al., "End-to-end learning of semantic role labeling using recurrent neural networks", Proceedings of the 53rd Annual Meeting of the Association for Computational Linguistics and the 7th International Joint Conference on Natural Language Processing, vol. 1: Long Papers, Jul. 26-31, 2015, pp. 1127-1137.
"Method and System of Semantic-based Multi-lingual Social Tag Grouping and Translation," An IP.com Prior Art Database Technical Disclosure, IP.com No. IPCOM000166759D, Jan. 22, 2008, 4 pages.
"A Language-Based Metric for Image Similarity and Retrieval," An IP.com Prior Art Database Technical Disclosure, IP.com No. IPCOM000257973D, Mar. 27, 2019, 5 pages.
"Method to Locate Resource Bundle for UI Strings Via Semantic Similarity Calculation," An IP.com Prior Art Database Technical Disclosure, IP.com No. IPCOM000263900D, Oct. 19, 2020, 5 pages.
Akbik et al., "POLYGLOT: Multilingual Semantic Role Labeling with Unified Labels," Proceedings of ACL-2016 System Demonstrations, P16-4001, Aug. 2016, 6 pages.
Baker et al., "Frame Semantics across Languages: Towards a Multilingual FrameNet," Proceedings of the 27th International Conference on Computational Linguistics: Tutorial Abstracts, C18-3003, Aug. 2018, 4 pages.
Conia et al., "InVeRo: Making Semantic Role Labeling Accessible with Intelligible Verbs and Roles," Proceedings of the 2020 EMNLP (Systems Demonstrations), Nov. 16-20, 2020, 9 pages.

(56) References Cited

OTHER PUBLICATIONS

Marquez et al., "Semantic Role Labeling: An Introduction to the Special Issue," Article in Computational Linguistics, Jun. 2008, 17 pages.

Gildea et al., "Automatic Labeling of Semantic Roles," Proceedings of the 38th Annual Meeting of the Association for Computational Linguistics, P00-1065, Oct. 2000, 45 pages.

Akbik et al., "Generating high quality proposition banks for multilingual semantic role labeling," Proceedings of the 53rd Annual Meeting of the Association for Computational Linguistics and the 7th International Joint Conference on Natural Language Processing (vol. 1: Long Papers), P15-1039, Jul. 2015, 11 pages.

Mulcaire et al., "Polyglot Semantic Role Labeling," Proceedings of the 56th Annual Meeting of the Association for Computational Linguistics (vol. 2: Short Papers), P18-2106, Jul. 2018, 6 pages.

"Predicate," http://verbs.colorado.edu/chinese/cpb/html_frames/4493-zhi-dao.html, accessed Oct. 11, 2021, 1 page.

"CVXOPT—Python Software for Convex Optimization," https://cvxopt.org/index.html, accessed Oct. 11, 2021, 2 pages.

Conia et al., "Unifying Cross-Lingual Semantic Role Labeling with Heterogeneous Linguistic Resources," Proceedings of the 2021 Conference of the North American Chapter of the Association for Computational Linguistics: Human Language Technologies, Jun. 6-11, 2021, 14 pages.

Marquez et al., "Semantic Role Labeling: An Introduction to the Special Issue," Computational Linguistics, vol. 34, No. 2, 2008, 16 pages.

Mell et al., "The NIST Definition of Cloud Computing," Recommendations of the National Institute of Standards and Technology, NIST Special Publication 800-145, Sep. 2011, 7 pages.

\* cited by examiner

DETERMINING SEMANTIC RELATIONSHIPS OF ARGUMENT LABELS

BACKGROUND

Semantic role labeling (SRL) is the task of identifying and classifying portions of a given sentence for use in further analysis. SRL includes labeling of each predicate and corresponding arguments in a given sentence, such as with defining labels. SRL can be employed to provide a meaning representation across syntactically different sentences in a language. Machine learning can be employed to analyze different SRL results to provide the meaning representations and/or for reasons of analysis of sentence structure, such for purposes of text-to-dictation, dictation-to-text, text classification, providing text responses and/or the like.

Semantic role labeling can identify predicate-argument structure(s) in a given sentence. An argument can be a portion of a sentence, such as the subject, action performed, noun on which the action was performed, noun for which the action was performed, and/or the like, in one example.

Different languages, however, can have different argument annotations. That is, different portions of a sentence can be labeled differently in semantic role labeling in different languages. Portions or arguments of a given sentence can have different order and/or length in different sentences in one or more different languages. Additionally, and/or alternatively, one or more arguments can be omitted and/or additional arguments added in one or more different languages.

As a result, one or more of argument annotations, labels, disambiguation, identification and/or classification in semantic role labeling in different languages also can be different. In existing techniques for multilingual semantic role labeling, semantic similarity between homogonous labels can be considered across two or more languages. Such semantic labels are either assumed as being different and/or are projected from English language to one or more other languages.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products can facilitate determination of semantic relationships of arguments labels provided in two or more languages. This can facilitate favorable comparison, analysis and/or other use of text relative to two or more languages, where the text is defined by the argument labels. The semantic relationships determined can comprise similar relationships and/or different relationships, one-to-one relationships and/or one-to-many relationships, and/or relationships for homogeneous or heterogeneous argument labels.

In accordance with an embodiment, a system can comprise a memory that stores computer executable components, and a processor that executes the computer executable components stored in the memory, wherein the computer executable components comprise a computation component that generates a defined label space comprising a semantic similarity relationship between detected semantic labels of a pair of languages.

In accordance with another embodiment, a computer-implemented method can comprise generating, by a system operatively coupled to a processor, a defined label space comprising a semantic similarity relationship between detected semantic labels of a pair of languages.

In accordance with yet another embodiment, a computer program product facilitating semantic role labeling can comprise a computer readable storage medium having program instructions embodied therewith, the program instructions executable by a processor to cause the processor to generate, by the processor, a defined label space comprising a semantic similarity relationship between detected semantic labels of a pair of languages.

DETAILED DESCRIPTION

Figure 1:
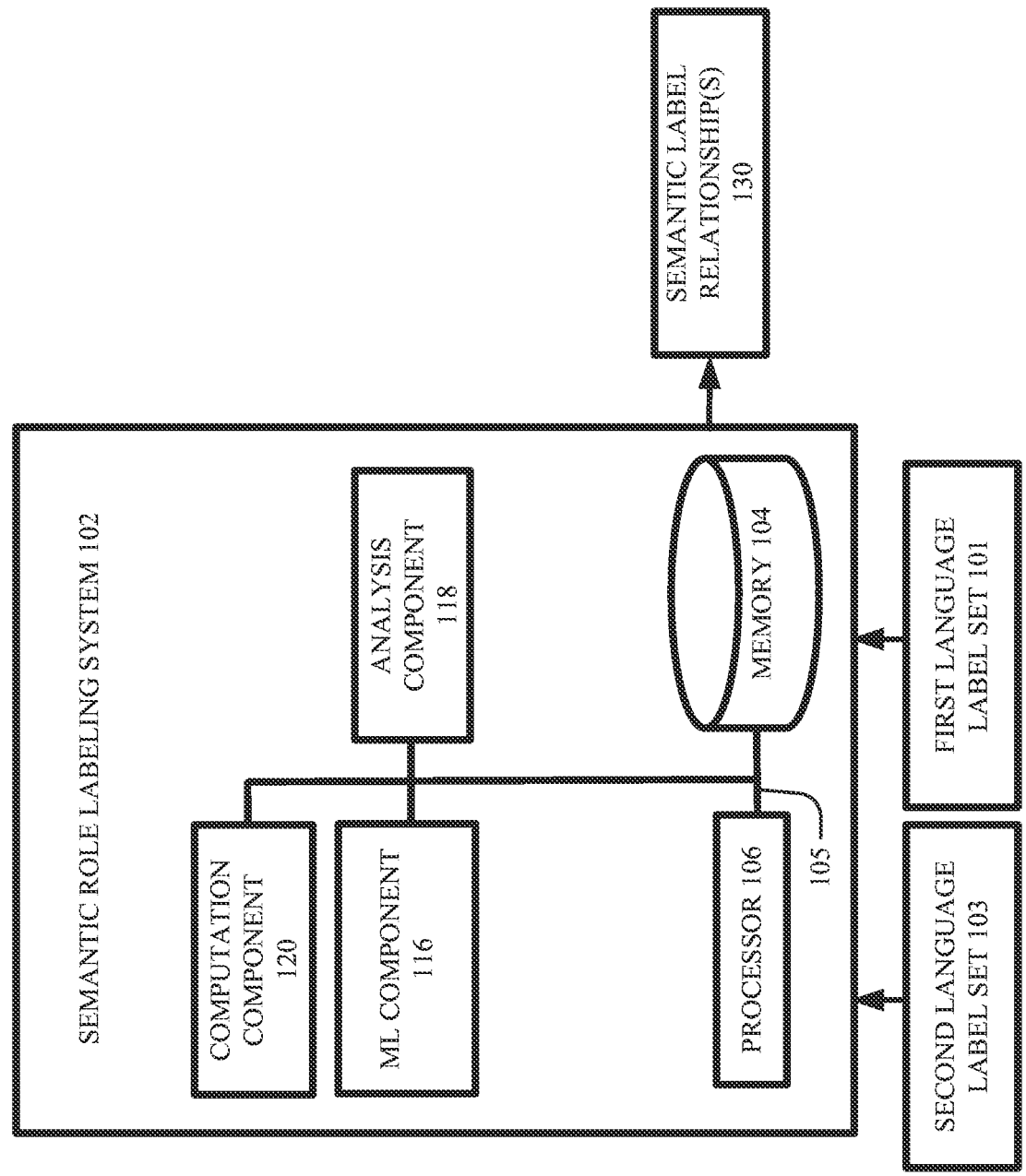
FIG. 1 illustrates a block diagram of an example, non-limiting system that can facilitate semantic role labeling across two or more different languages, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Described herein are one or more embodiments of a system, computer-implemented method and/or computer program product that can account for one or more deficiencies of exiting techniques for semantic role labeling of written, typed and/or otherwise generated text. Generally, provided are one or more embodiments of a system, computer-implemented method and/or computer program product that can facilitate semantic role labeling (SRL) to determine semantic relationships among two or more different languages. Semantic labels across languages can be automatically detected using machine learning, where semantic labels across languages can be determined as different or similar, and further can be performed without relating specifically to English language semantic labels.

For example, given a section of text in a source language and also in a different and target language, the text can be analyzed to break the text into tokens. The tokens can be, for example, actions, subjects, objects, adjuncts and/or the like. A predicate, referring to the action in SRL space, can be identified, with other tokens being identified based on the predicate. A sense of the predicate can be determined, referring to determining the meaning of the action in SRL space. Arguments then can be identified for the tokens based on the predicate. Argument labels can be applied in a language to classify the tokens.

The arguments typically employed in one language can be similar and/or different in other languages. Certain argument labels (e.g., the descriptor of the label or the words of the label) can share semantic meaning across one or more languages and/or can not share semantic meaning with one or more other languages. For example, an argument in one language can share a semantic meaning in one language, but yet still be represented by a different descriptor in another language. In another example, another argument in one language can have no commensurate argument in another language. In another example, another argument can be related to one or more arguments in another language.

Employing the one or more embodiments described herein, arguments in the label space can be identified for a pair of languages, and relationships between the arguments can be determined. The relationships can be described employing one or more classifications, such as defining proximity to one another. Employing the varying levels of proximity can result in better understanding of text from a pair of languages in comparison to employing mere absolute definitions of proximity.

In addition, this technique can allow for back-and-forth projection between different languages, rather than mere projection from one language to other languages, without reverse projection from the other languages to the one language. In one example, English to other language projection can be but one of many different projections able to be provided by the one or more embodiments described herein. This can make up for a deficiency of existing techniques where language specific details can be lost due to projection in only one direction, such as always based on the English language.

One or more embodiments are now described with reference to the drawings, where like referenced numerals are used to refer to like elements throughout. As used herein, the terms "entity", "requesting entity" and "user entity" can refer to a machine, device, component, hardware, software, smart device and/or human. In the following description, for purposes of explanation, numerous specific details are set forth in order to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting system 100 as illustrated at FIG. 1, and/or systems thereof, can further comprise, be associated with and/or be coupled to one or more computer and/or computing-based elements described herein with reference to an operating environment, such as the operating environment 800 illustrated at FIG. 8. In one or more described embodiments, computer and/or computing-based elements can be used in connection with implementing one or more of the systems, devices, components and/or computer-implemented operations shown and/or described in connection with FIG. 1 and/or with other figures described herein.

Turning first generally to FIG. 1, one or more embodiments described herein can include one or more devices, systems and/or apparatuses that can facilitate semantic role labeling across two or more different languages. For example, FIG. 1 illustrates a block diagram of an example, non-limiting system 100 that can determine semantic relationships of argument labels provided in two or more different languages. The semantic relationships can be defined based on projection from any one language to any one or more other languages.

At FIG. 1, illustrated is a block diagram of an example, non-limiting system 100 that can facilitate a process for determining semantic relationships, in accordance with one or more embodiments described herein. While referring here to one or more processes, facilitations and/or uses of the non-limiting system 100, description provided herein, both above and below, also can be relevant to one or more other non-limiting systems described herein, such as the non-limiting system 200, to be described below in detail.

As illustrated at FIG. 1, the non-limiting system 100 can comprise semantic role labeling system 102. Semantic role labeling system 102 can comprise one or more components, such as a memory 104, processor 106, bus 105, analysis component 118, machine learning (ML) component 116 and/or computation component 120. Generally, semantic role labeling system 102 can facilitate generation of one or more semantic label relationships 130 as results, using a first language label set 101 and a second language label set 103. In one or more cycles of use of the semantic role labeling system 102, one set of labels can be for a source language being compared to another set of labels for a target language.

One or more aspects of a component can be employed separately and/or in combination, such as employing one or more of a memory or a processor of a system that includes the component to thereby facilitate determination of one or more semantic label relationships 130. The ML component 116 can generate an ML model for being employed by the analysis component 118 to analyze the label sets 101 and 103. The computation component 120 can generate a transformation based on the analysis, which transformation can be employed to generate a defined label space comprising one or more semantic similarity and/or semantic difference relationships between the semantic labels of the semantic label sets 101 and 103. These components can employ the entity-based model 110, processor 106 and/or the memory 104. Additionally and/or alternatively, the processor 106 can execute one or more program instructions to cause the processor to perform one or more operations by these components.

The first language label set 101 and the second language label set 103 can be received and/or retrieved by any suitable means. The label sets 101 and 103 can each comprise one or more semantic labels in the respective pair of languages. The label sets 101 and 103 can be provided in any suitable format, such as a text format, binary format and/or another suitable format. In one or more embodiments, the label sets 101 and 103 can be received, located, identified and/or otherwise determined by the semantic role labeling system 102, such as by a component and/or aspect of the semantic role labeling system 102 other than the analysis component 118, such as the memory 104, a storage component and/or a download component.

The semantic label relationships 130 generated can be comprised by the defined label space generated. The semantic label relationships 130 can be provided in any suitable format for future use by the semantic role labeling system 102 or by another system, such as a lookup table, geometric representation and/or the like.

Figure 2:
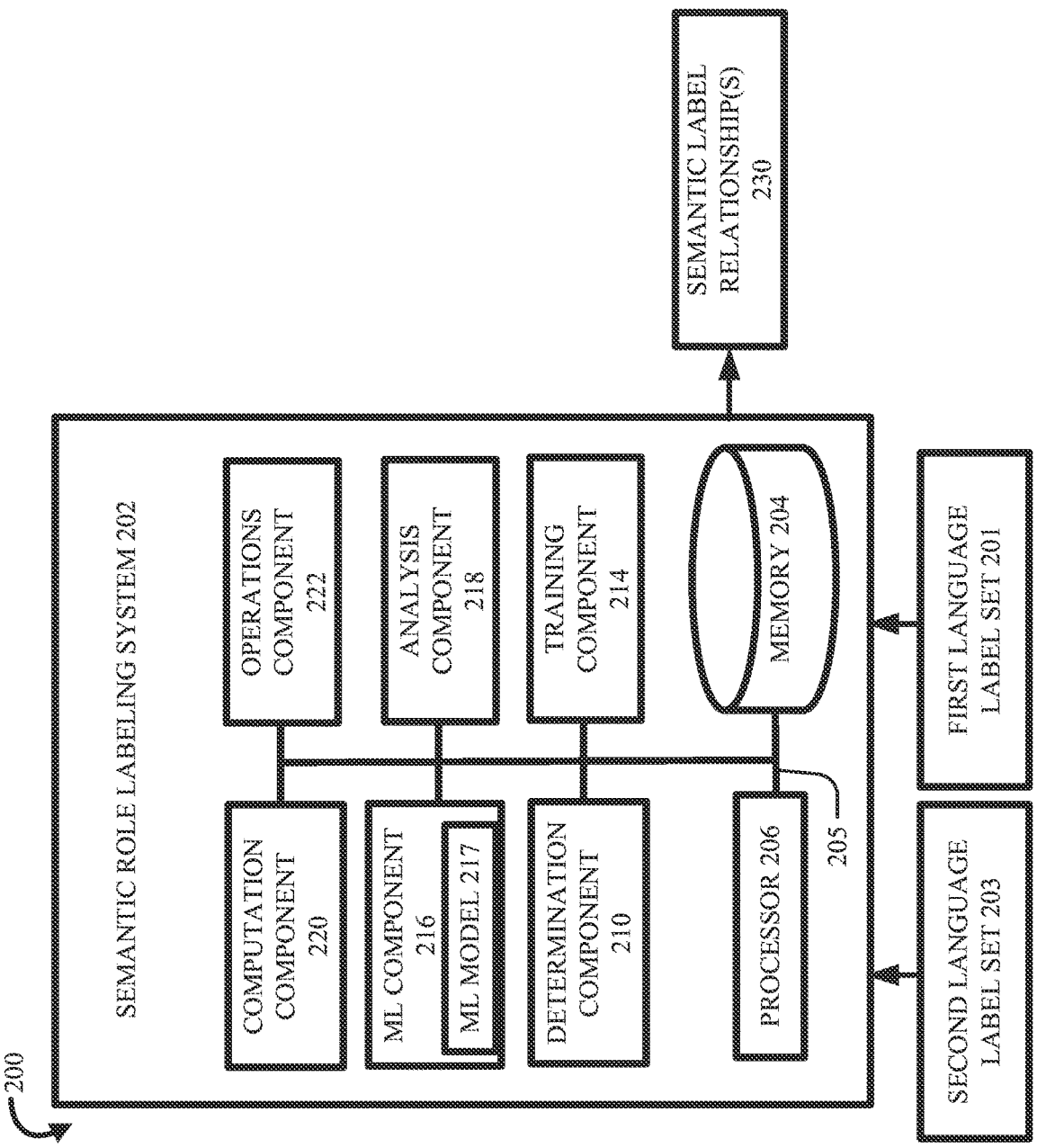
FIG. 2 illustrates a block diagram of another example, non-limiting system that can facilitate semantic role labeling across two or more different languages, in accordance with one or more embodiments described herein.

Turning next to FIG. 2, the figure illustrates a diagram of an example, non-limiting system 200 that can facilitate a process for determining semantic relationships, in accordance with one or more embodiments described herein. Repetitive description of like elements and/or processes employed in respective embodiments is omitted for sake of brevity. As indicated previously, description relative to an embodiment of FIG. 1 can be applicable to an embodiment of FIG. 2. Likewise, description relative to an embodiment of FIG. 2 can be applicable to an embodiment of FIG. 1.

As illustrated, the non-limiting system 200 can comprise a semantic role labeling system 202. The semantic role labeling system 202, as illustrated, can comprise any suitable type of component, machine, device, facility, apparatus and/or instrument that comprises a processor and/or can be capable of effective and/or operative communication with a wired and/or wireless network. All such embodiments are envisioned. For example, semantic role labeling system 202 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the semantic role labeling system 202 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

The semantic role labeling system 202 can be associated with, such as accessible via, a cloud computing environment. For example, the semantic role labeling system 202 can be associated with a cloud computing environment 1350 described below with reference to FIG. 13 and/or with one or more functional abstraction layers described below with reference to FIG. 14 (e.g., hardware and software layer 1460, virtualization layer 1470, management layer 1480 and/or workloads layer 1490).

Operation of the non-limiting system 200 and/or of the semantic role labeling system 202 is not limited to identification of a single pair of semantic labels at a time or to generation of a single defined label space at a time. Rather, operation of the non-limiting system 200 and/or of the semantic role labeling system 202 can be scalable. For example, the non-limiting system 200 and/or the semantic role labeling system 202 can facilitate determination of one or more pairs of semantic labels and/or facilitate generation of one or more defined label spaces at a time.

The semantic role labeling system 202 can comprise a plurality of components. The components can include a memory 204, processor 206, bus 205, determination component 210, training component 214, machine learning (ML) component 216, machine learning (ML) model 217, analysis component 218, computation component 220 and/or operations component 222. Like the semantic role labeling system 102, the semantic role labeling system 202 can be operated to generate a defined label space comprising one or more semantic label relationships 230, such as based upon a first language label set 201 and a second language label set 203 of labels (e.g., argument labels) of a pair of different languages.

The first language label set 201 and the second language label set 203 can be received and/or retrieved by any suitable means. The label sets 201 and 203 can each comprise one or more semantic labels in the respective pair of languages. The label sets 201 and 203 can be provided in any suitable format, such as a text format, binary format and/or another suitable format. In one or more embodiments, the label sets 201 and 203 can be received, located, identified and/or otherwise determined by the semantic role labeling system 202, such as by a component and/or aspect of the semantic role labeling system 202 other than the analysis component 218, such as the memory 204, a storage component and/or a download component.

The semantic label relationships 230 generated can be comprised by the defined label space generated. The semantic label relationships 230 can be provided in any suitable format for future use by the semantic role labeling system 202 or by another system, such as a lookup table, geometric representation and/or the like.

One or more communications between one or more components of the non-limiting system 200, and/or between an entity providing the label sets 201 and 203 and the non-limiting system 200, can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion now turns to the processor 206, memory 204 and bus 205 of the semantic role labeling system 202.

For example, in one or more embodiments, semantic role labeling system 202 can comprise a processor 206 (e.g., computer processing unit, microprocessor, classical processor, quantum processor and/or like processor). In one or more embodiments, a component associated with semantic role labeling system 202, as described herein with or without reference to the one or more figures of the one or more embodiments, can comprise one or more computer and/or machine readable, writable and/or executable components and/or instructions that can be executed by processor 206 to facilitate performance of one or more processes defined by such component(s) and/or instruction(s). In one or more embodiments, the processor 206 can comprise the determination component 210, training component 214, machine learning (ML) component 216, machine learning (ML) model 217, analysis component 218, computation component 220 and/or operations component 222.

In one or more embodiments, the semantic role labeling system 202 can comprise a computer-readable memory 204 that can be operably connected to the processor 206. The memory 204 can store computer-executable instructions that, upon execution by the processor 206, can cause the processor 206 and/or one or more other components of the semantic role labeling system 202 (e.g., determination component 210, training component 214, machine learning (ML) component 216, machine learning (ML) model 217, analysis component 218, computation component 220 and/or operations component 222) to perform one or more actions. In one or more embodiments, the memory 204 can store computer-executable components (e.g., determination component 210, training component 214, machine learning (ML) component 216, machine learning (ML) model 217, analysis component 218, computation component 220 and/or operations component 222).

Semantic role labeling system 202 and/or a component thereof as described herein, can be communicatively, electrically, operatively, optically and/or otherwise coupled to one another via a bus 205 to perform functions of non-limiting system 200, semantic role labeling system 202 and/or one or more components thereof and/or coupled therewith. Bus 205 can comprise one or more of a memory bus, memory controller, peripheral bus, external bus, local bus, quantum bus and/or another type of bus that can employ one or more bus architectures. One or more of these examples of bus 205 can be employed to implement one or more embodiments described herein.

In one or more embodiments, semantic role labeling system 202 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical and/or quantum computing devices, communication devices and/or like devices), such as via a network. In one or more embodiments, one or more of the components of the non-limiting system 200 can reside in the cloud, and/or can reside locally in a local computing environment (e.g., at a specified location(s)).

In addition to the processor 206 and/or memory 204 described above, semantic role labeling system 202 can comprise one or more computer and/or machine readable, writable and/or executable components and/or instructions that, when executed by processor 206, can facilitate performance of one or more operations defined by such component(s) and/or instruction(s).

Turning now to the determination component 210, the determination component can identify the label sets 201 and 203 in any suitable manner. The label sets 201 and/or 203 can be downloaded, identified, received, uploaded, read and/or otherwise determined. The label sets 201 and 203 can be stored at any suitable location internal or external to the semantic role labeling system 202 and/or internal or external to the non-limiting system 200.

Turning next to the training component 214, such component can train an ML model 217 based on existing and/or known semantic relationships between pairs of semantic labels of a pair of different languages. These relationships can be of similarity, differences, one-to-one, one-to many, homogeneous and/or heterogeneous. The training component 214 can employ one or more differentials, artificial intelligence (AI) model, deep learning and/or like to train the ML model 217.

The ML model 217 can be stored at any suitable location internal or external to the semantic role labeling system 202 and/or internal or external to the non-limiting system 200.

The analysis component 218 can employ the detected semantic label sets to determine one or more pairs of related semantic labels. The relation can be a similarity relationship, and can be other than a direct relationship. That is, the semantic labels can be different in the different languages, but also related, as will be explained further with respect to FIGS. 3-6.

Accordingly, description now turns temporarily to FIGS. 3-6, to allow for better understanding of the semantic labels being analyzed by the analysis component 218.

Figure 3:
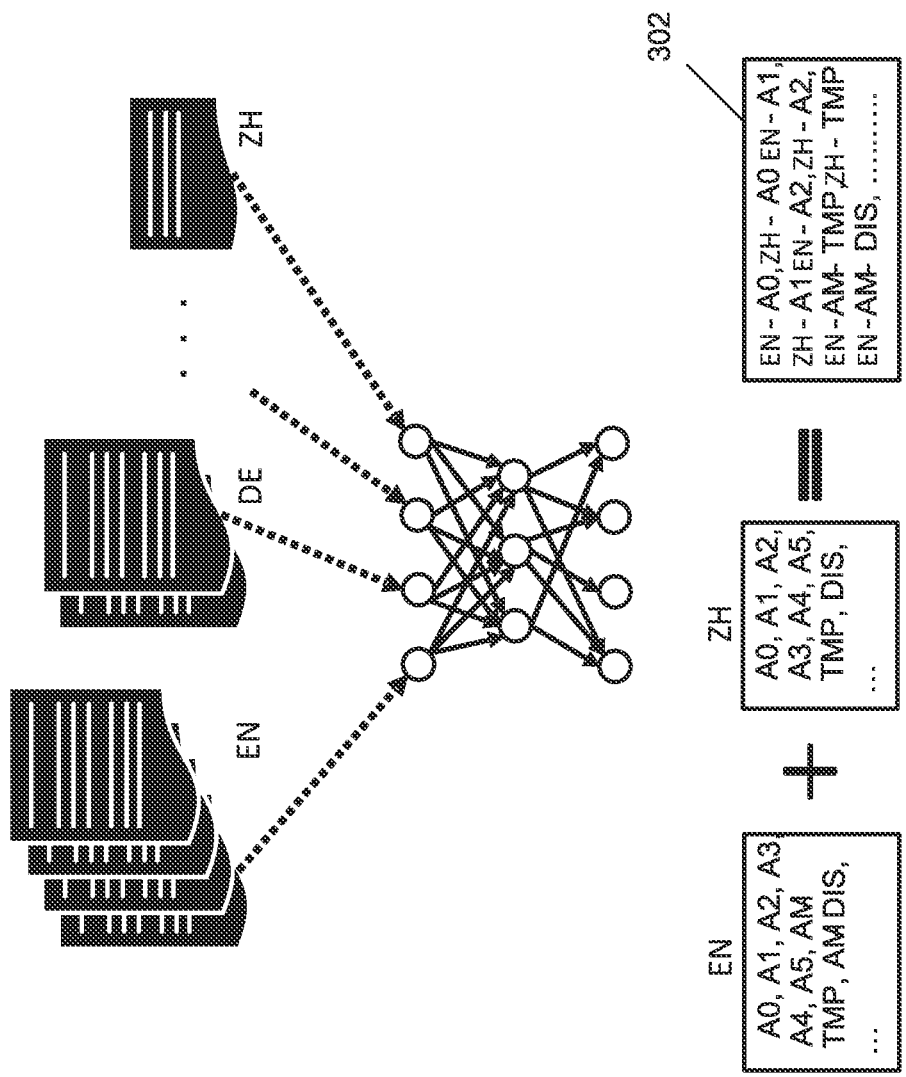
FIG. 3 illustrates a high-level schematic diagram one or more operations that can be performed by the non-limiting system of FIG. 2, in accordance with one or more embodiments described herein.
Figure 4:
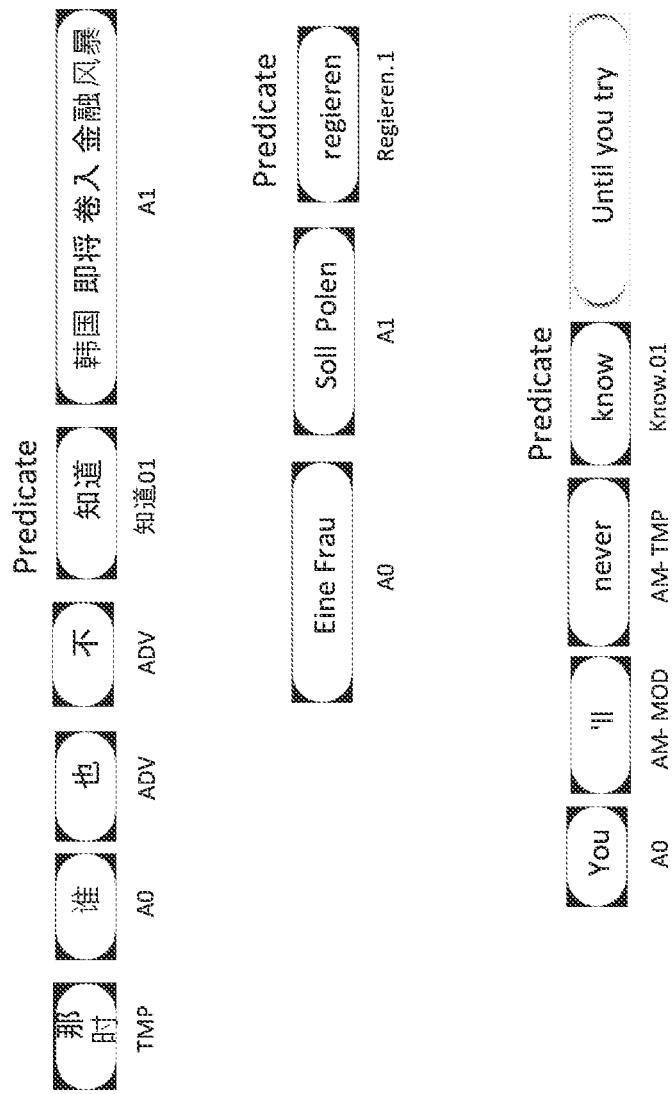
FIG. 4 illustrates semantic labeling of a phrase in three languages, in accordance with one or more embodiments described herein.

At FIG. 3, a high-level diagram 300 is illustrated defining operations that can be performed by the semantic role labeling system 202, such as by the analysis component 218 and/or computation component 220. As illustrated, label sets in various languages of English, German and Chinese can be fed into the semantic role labeling system 202. For each pair of languages, such as shown for English and Chinese, semantic labels can be determined and combined, such as via analysis by the analysis component 218 and further computation by the computation component 220 to provide a defined label space 302. The defined label space 302 can be any suitable representation such as lookup table, matrix, geometric representation and/or the like. The defined label space 302 can comprise one or more semantic relationships 230 such as similarity relationships. As indicated above, the semantic relationships of the defined label space 302 can be similarity, difference, homogeneous, heterogeneous, At FIG. 4, the phrase "You'll never know until you try" is presented in three languages of Chinese, German and Chinese. This phrase is presented to better describe the use of the terms token, argument, predicate, label and descriptor, and also to provide background for one or more operations performed by the analysis component 218, ML component 216 and/or computation component 220. One or more operations can be performed separately for each language. First a predicate or action is identified. In English, the predicate is "know". Next, a sense (e.g., meaning) of the predicate is determined, such as by a suitable ML model, such as the ML model 217, or other suitable lookup operation. Next, other portions of the text for each language are broken into tokens based on the determined predicate. In English, tokens are identified as "You", "'ll", and "never". These tokens represent a subject, subject modifier and temporal component of the text, relative to the predicate "know". The respective frame for "know" in English does not include a label for "until you try".

Figure 5:
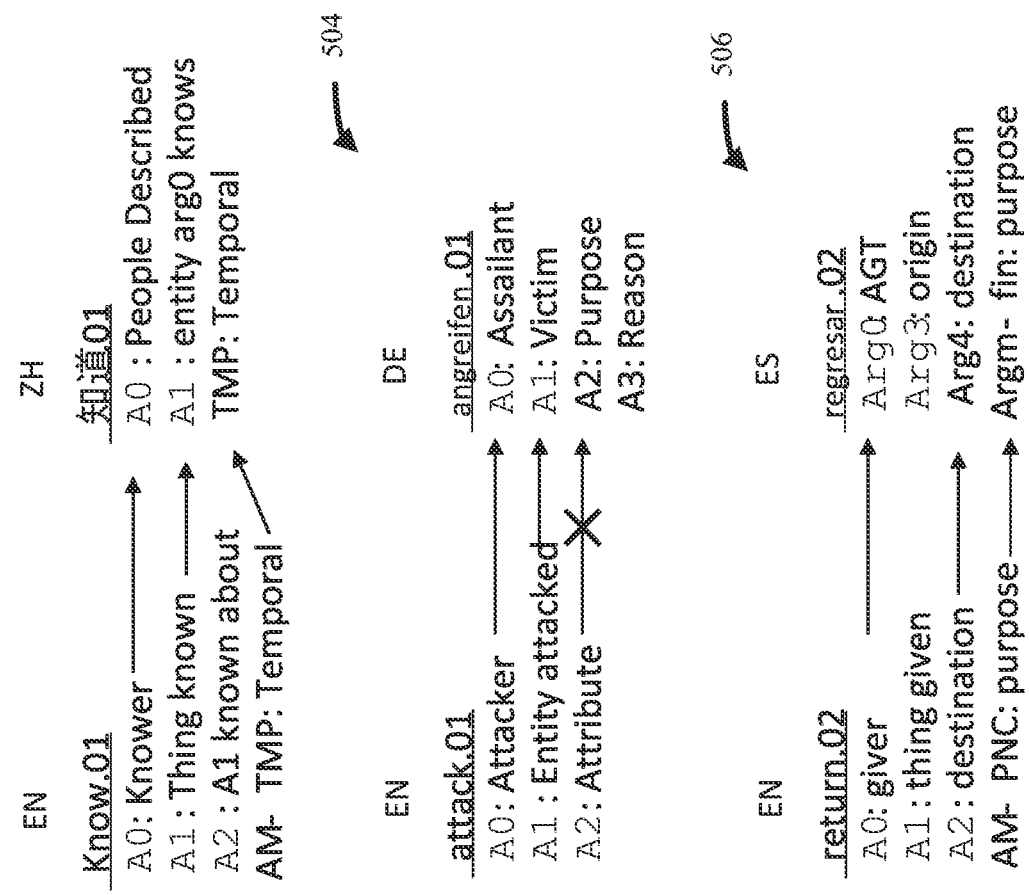
FIG. 5 illustrates comparison of frames of pairs of languages based on the predicate identified, in accordance with one or more embodiments described herein.

Turning next to FIG. 5, semantic labels can be applied to the text, e.g., by the operations component 222, as will be described later. That is, focus now is on determining relationships between labels, which labels can be employed to analyze text in different languages. Sentence structure is provided relative to FIGS. 4 and 5 for illustration of the terms token, argument, predicate, label and descriptor.

At FIG. 5, semantic labels can be applied to each token. These semantic labels can be standard labels utilized in the respective space, industry-standard labels for each language, and/or entity-defined labels submitted to the non-limiting system 200, such as to the semantic role labeling system 202 for training of the ML model 217 by the training component 214. Further, when labeling tokens, initial descriptors of the labels, such as A0, AM, Arg0 can be different as typically employed in different languages, such as due to standards, industry-usage and/or entity preference. Differently numbered argument can refer to different types of tokens in different languages, in one or more embodiments. Different letter or phrase descriptors such as A and Arg can be utilized in different languages, in one or more embodiments. Accordingly, the ML model 217 can account for these differences by learning based on existing labels known to the ML model 217.

As shown at FIG. 5, at frame 502, comparing English and Chinese labels, not all labels from one language are employed by all other languages. That is, an argument "ll" with a label A2 having a descriptor "known about" does not have a commensurate related label or argument in the Chinese language.

Relative to frame 504, comparing English and German labels, a label for A2: attribute can, in one or more cases correlate to a label of purpose in German, but not for all instances. That is, the correlation can depend on the token/argument to which the label has been assigned. Accordingly, relationships between labels can be different based on actual text of the languages to which the labels are assigned. Indeed, label relationships can be non-absolute, and thus use of the one or more embodiments described herein can provide further benefit by representing this state, such as in terms of proximity in a defined label state representation.

Relative to frame 506, the term "PNC" can be employed to represent purpose in a semantic label in English, where term "fin" can be employed to represent purpose in Spanish. That is, even where same descriptor meanings are employed for same labels in different languages, different actual descriptors can be used. Again, use of the one or more embodiments described herein can provide further benefit by learning this similarity relationship between purpose labels.

Figure 6:
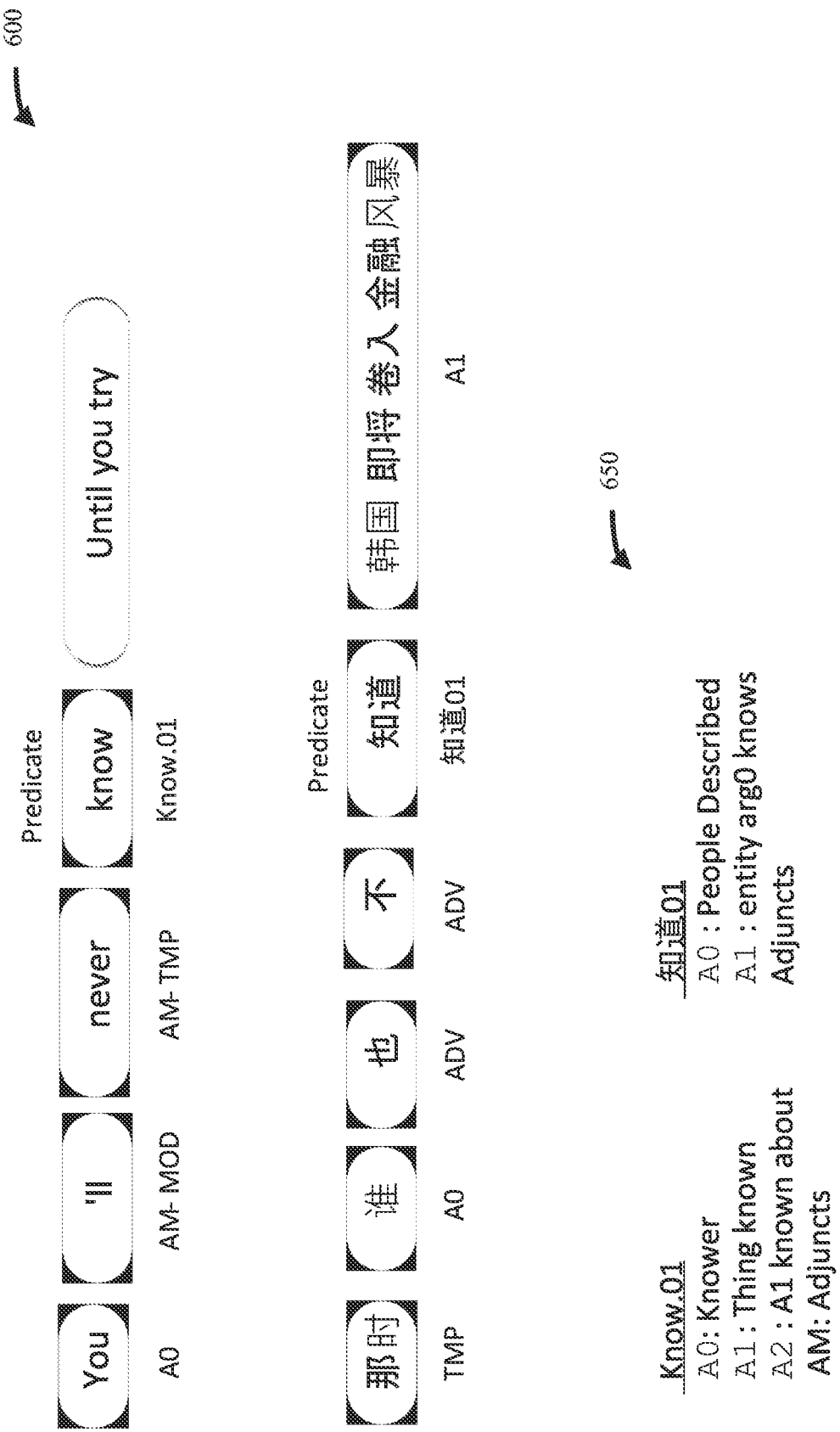
FIG. 6 illustrates further comparison of frames of a pair of languages, in accordance with one or more embodiments described herein.

Looking next to FIG. 6, further example 600 is illustrated for the phrase "You'll never know until you try". As shown at frame 650, a subject label can have a descriptor of "Knower" in English, but "People Described" in Chinese, in one example. That is, as with frame 506 of FIG. 5, even where same descriptor meanings are employed for same labels in different languages, different actual descriptors can be used.

Turning back again to FIG. 2, further operations of the semantic role labeling system 202 will be described, particularly for determining semantic label pairs, analyzing the semantic label pairs and assigning one or more semantic relationships to one or more of the semantic label pairs.

The ML component 216 in combination with the analysis component 218 can employ the ML model 217 to solve a constrained optimization problem for one or more pairs of semantic labels. Final (e.g., last) layer weights of source and target language annotations (e.g., of the sets of semantic labels 201 and 203) can be employed to solve a constrained optimization, such as an integer linear programming optimization. Other constrained optimizations can be employed where suitable.

In one embodiment, the constrained optimization can be employed to solve for T, being discrete 0-1 decision variables, where $u_i$ is a source language argument representation, and $v_j$ is a target language argument representation.

The pair matching Equation 1 of an integer linear programming optimization can be:

$$\underset{T}{\text{minimize}} \sum_{i}^{k_s} \sum_{j}^{k_t} T_{ij} \|u_i - v_j\|_2^2$$

$$\text{subject to } \sum_{i} T_{ij} \leq 1, j = 1, \ldots, k_t$$

$$\sum_{j} T_{ij} \leq 1, i = 1, \ldots, k_s$$

$$\sum_{i,j} T_{ij} \geq \min(k_t, k_s), j = 1, \ldots, k_t;$$

$$i = 1, \ldots, k_s$$

$$T_{ij} \in \{0, 1\}, \forall\, i, j.$$

The computation component 220 can receive, identify, learn and/or otherwise determine an output of the constrained optimization solution from the analysis component 218. For example, a transformation can be written in its respective parametric form and the parameters of the transformation can be learned during a training process, such as employing the training component 214. The transformation can be trained on the determined sets 201 and 203, for example.

By applying a transformation, such as a geometric transformation, affine transformation and/or other suitable transformation, the matched pairs output from the constrained optimization solution. In one example, the following Equations 2 of an affine transformation can be employed:

$$\mathcal{L}_{Base} = -\frac{1}{n}\sum_{i=1}^{n} p(y' = y_i \mid x_i; \theta),$$

$$\mathcal{L}_{CLAR} = \mathcal{L}_{Base} + \lambda \sum_{i=1}^{K} \|u_i - \Psi v_i + b\|_2^2.$$

In the above Equations 2, $L_{Base}$ is standard cross-entropy loss function where n is the number of training examples in training data, p is a defined expected probability, y' is a predicted semantic label, $y_i$ is a true semantic label, $x_i$ is an input sentence, and Θ is parameters of the model. Also, $L_{CLAR}$ is a loss function that can augment the standard loss function, where $L_{Base}$ is standard cross-entropy loss function, λ defines the quantity of the other elements to be added to the standard loss function where the quantity can be obtained via repetitive experiments, K is the number of paired semantic labels, $u_i$ and $v_i$ are the feature representations of paired semantic roles, and Ψ and b are the weight learned via training the transformation, where Ψ and b constitute the transformation. (See also, FIG. 8).

In one or more embodiments, as described above, one or more operations of the semantic role labeling system 202 can be performed based on label sets, such as label sets 201 and 203 apart from assignment to text, such as for training or generation of a defined label space for the labels of the label sets 201 and 203.

In one or more embodiments, one or more operations of the semantic role labeling system 202 can be performed relative to a specific set of semantic labels as applied to text of different languages of a pair of languages. As such, a defined label space can be generated based on such labels that further can be employed, such as by the operations component 222 to analyze and/or compare different text of two or more languages.

Figure 7:
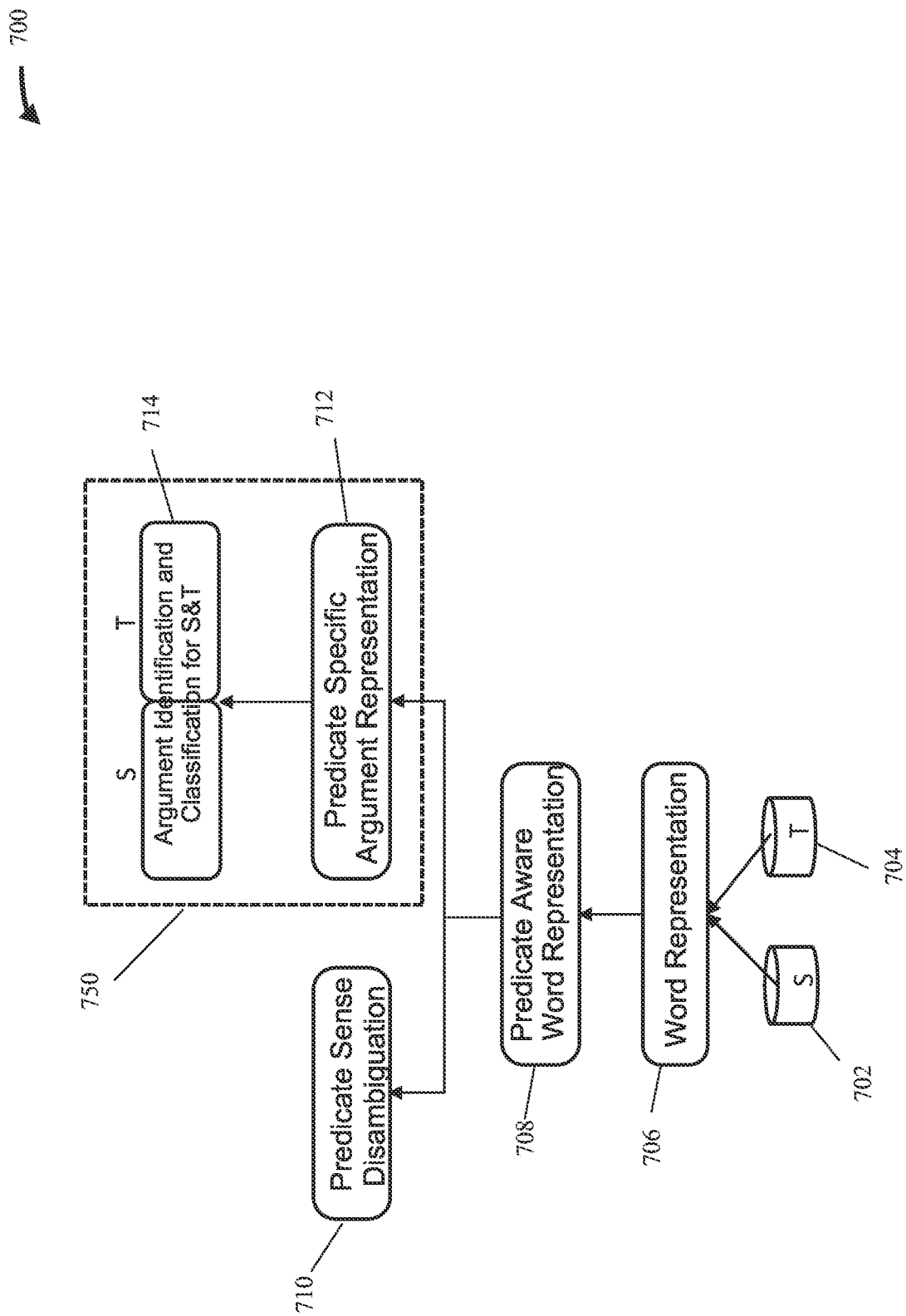
FIG. 7 illustrates a process flow for generating a defined label space, in accordance with one or more embodiments described herein.

Looking next to FIG. 7, a process flow 700 is illustrated, such as employing the non-limiting system 200, for generating a defined label space for language source data S (702) and target data T (704). Repetitive description of like elements and/or processes employed in respective embodiments is omitted for sake of brevity.

Operation 706 can comprise determining text and or word representations, such as by the analysis component. This can include identifying the words of the text, such as employing the analysis component 218 and/or the ML model 217. Operation 708 can comprise determining a predicate of the text, such as employing the analysis component 218. Operation 710 can comprise predicate sense disambiguation, thus defining a meaning of the predicate, such as generalizing a predicate word in its base present tense form. Operation 712 can comprise predicate specific argument representation, such as employing the analysis component 218 and/or ML model 217 to assign, identify and solve a constrained optimization for the source data 702 and 704 that has been broken into tokens/arguments and to which labels have been assigned. An output of this step to operation 714 can be a set of related pairs of semantic labels. This step is further illustrated at FIG. 8.

At operation 714, argument identification and classification is performed for the pairs of semantic labels of the source datas 702 and 704 output from operation 712. In one example, the computation component 220 can generate and/or identify a transformation, such as transformation 850 at FIG. 8. The transformation 850 can be any suitable transformation such as a geometric transformation. The illustrated transformation at 850 can, for pairs of semantic labels determined, adjust a feature representation of the semantic labels based on proximity in a features space (e.g., label space). Input can be feature representations of paired semantic roles.

Figure 8:
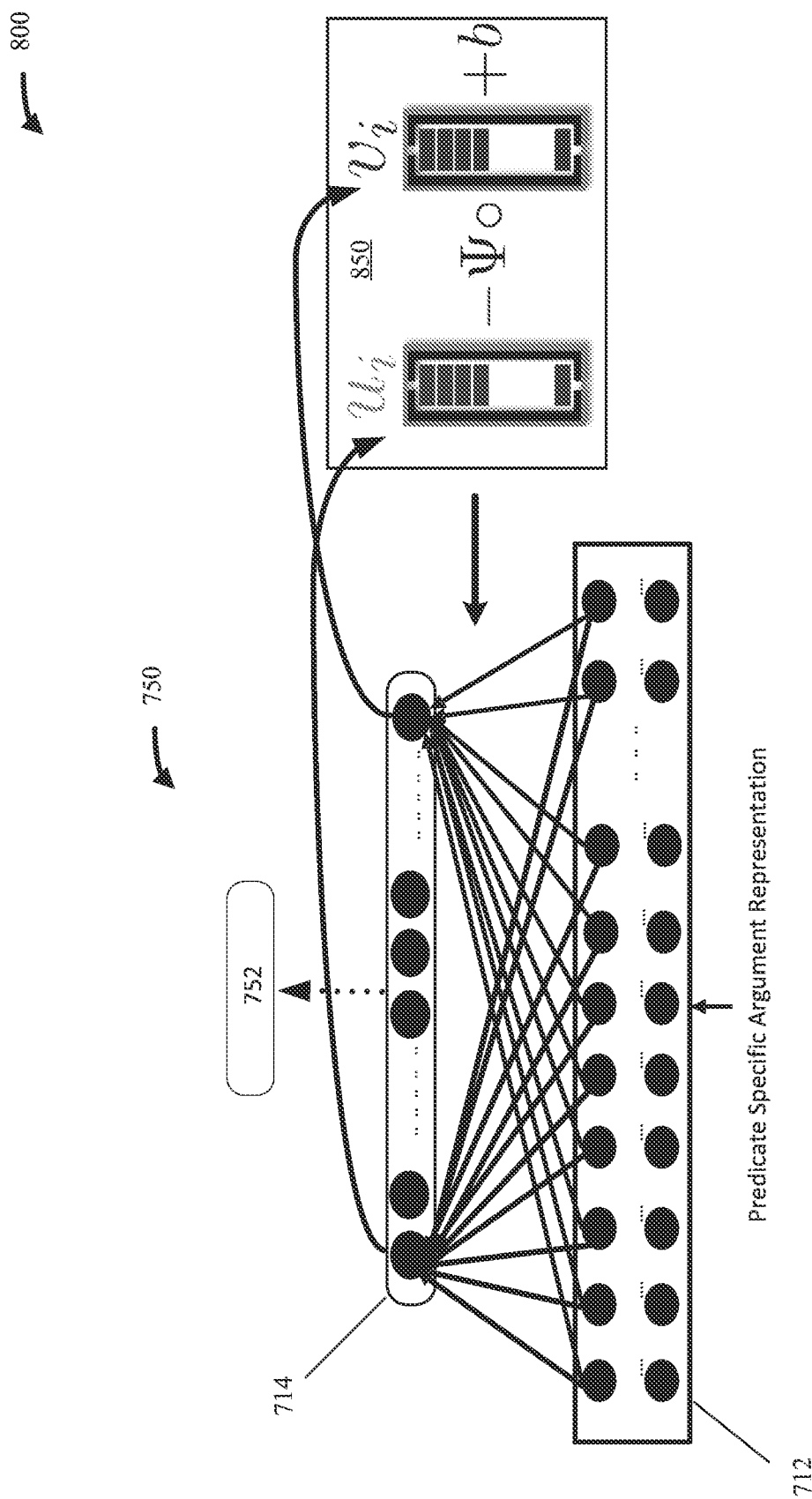
FIG. 8 illustrates a portion of the process flow of FIG. 7, in accordance with one or more embodiments described herein.

As illustrated at FIG. 8, neurons representing the semantic labels of a final layer of the ML model 217 are shown. That is, the computation component 220 further can employ the ML model 217. Via the transformation and the computation component 220, semantic relationships can be assigned to the pairs of semantic labels, thereby generating a defined label space 752 of the relationships. In addition, a softmax function can be employed to further define the label space 752, where a vector of real numbers can be an input, and the softmax function can normalize the vector into a probability distribution consisting of probabilities proportional to the exponentials of the input numbers.

The defined label space 752 can comprise one or more semantic relationships between one or more pairs of semantic labels of the determined semantic labels. The semantic label relationships can include a similarity relationship, a difference relationship, a no-correspondence relationship, a probable relationship and/or the like. A relationship can be definite and/or have a degree of probability assigned by the computation component, such as a degree of proximity. A label in one language can have a similarity relationship to a label in another language based on the argument to which the labels are assigned, but relative to different arguments of different text, such similarity relationship can be different (e.g., different proximity) and/or non-existent. As indicated above, a label in one language can have a similarity relationship with one or more labels in another language (e.g., one-to-many relationships). These one-to-many relationships can have the same or different levels of proximity. Further, the pair of languages can include two non-English languages.

Figure 9:
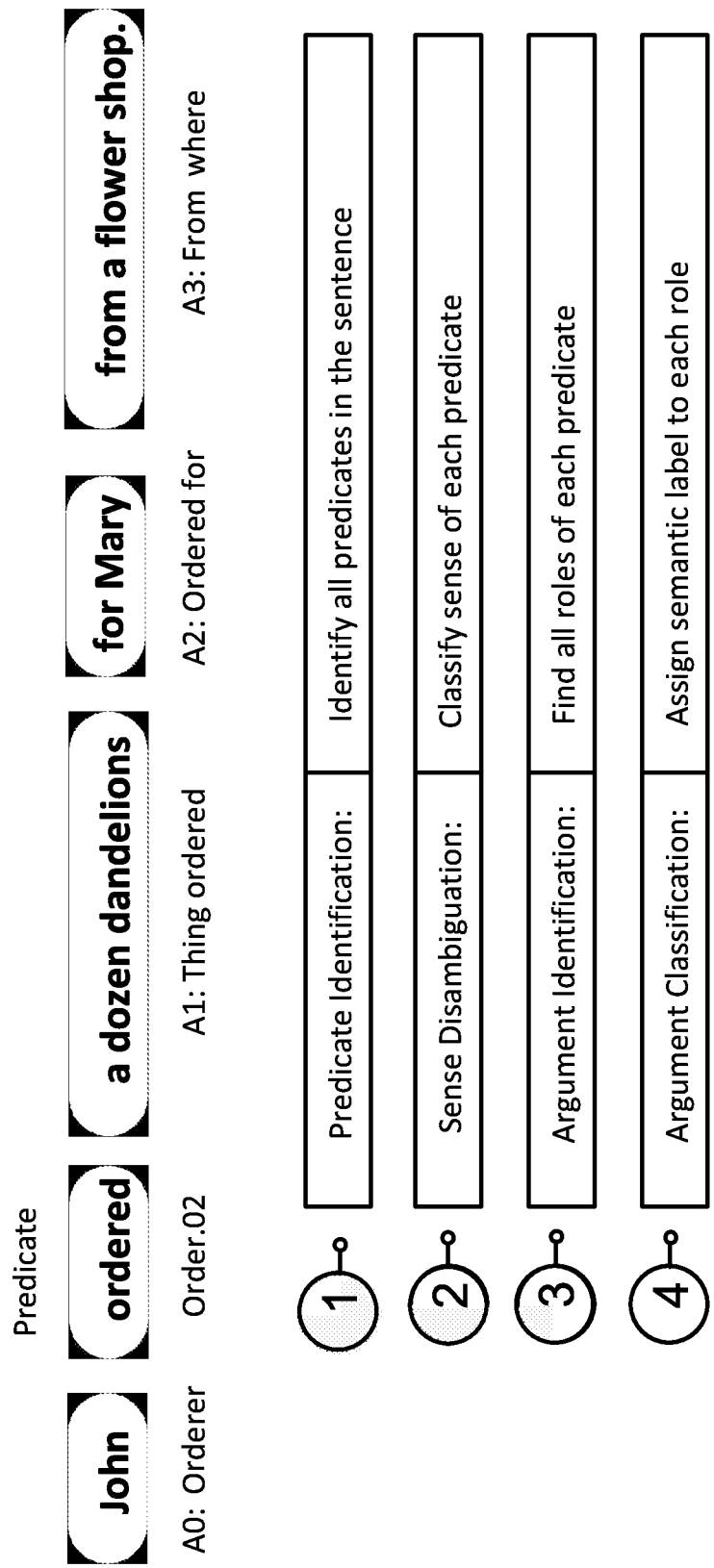
FIG. 9 illustrates a process comprising one or more operations for semantic role labeling, in accordance with one or more embodiments described herein.

Turning now briefly to FIG. 9, the figure illustrates a diagram of an example, non-limiting process flow 900 that can be executed by the analysis component 218, such as at direction of the operations component 222 of the non-limiting system 200 of FIG. 2, relative to text in one or more languages identified by the operations component 222. Repetitive description of like elements and/or processes employed in respective embodiments is omitted for sake of brevity.

As shown, the analysis component 218 can receive and/or otherwise determine a set of words. The words can be identified by the analysis component 218. The analysis component can identify a predicate of the words at step 1. As shown, the predicate is "ordered". The analysis component can classify a sense for each predicate in the text, at step 2. For example, a related sense can be "order". At step 3, the analysis component 218 can identify arguments of the text of the pair of languages, based on the predicate, thus breaking the text further down into tokens. At step 4, the analysis component 218 can assign semantic labels to the arguments of the text.

The same steps 1-4 can be performed for a same text in a different language, with the semantic role labeling system 202 being employed to determine related pairs of semantic labels of the pair of languages by employing a constrained optimization, such as by the ML model 217, analyze the pairs of semantic labels using a transformation, such as a geometric transformation, such as by the computation component 220, and further to generate a defined label space, such as by the computation component 220 using the transformation.

The defined label space can comprise one or more semantic relationships between one or more pairs of semantic labels of the determined semantic labels. The semantic label relationships can include a similarity relationship, a difference relationship, a no-correspondence relationship, a probable relationship and/or the like. A relationship can be definite and/or have a degree of probability assigned by the computation component, such as a degree of proximity. A label in one language can have a similarity relationship to a label in another language based on the argument to which the labels are assigned, but relative to different arguments of different text, such similarity relationship can be different (e.g., different proximity) and/or non-existent. As indicated above, a label in one language can have a similarity relationship with one or more labels in another language (e.g., one-to-many relationships). These one-to-many relationships can have the same or different levels of proximity. Further, the pair of languages can include two non-English languages.

Figure 10:
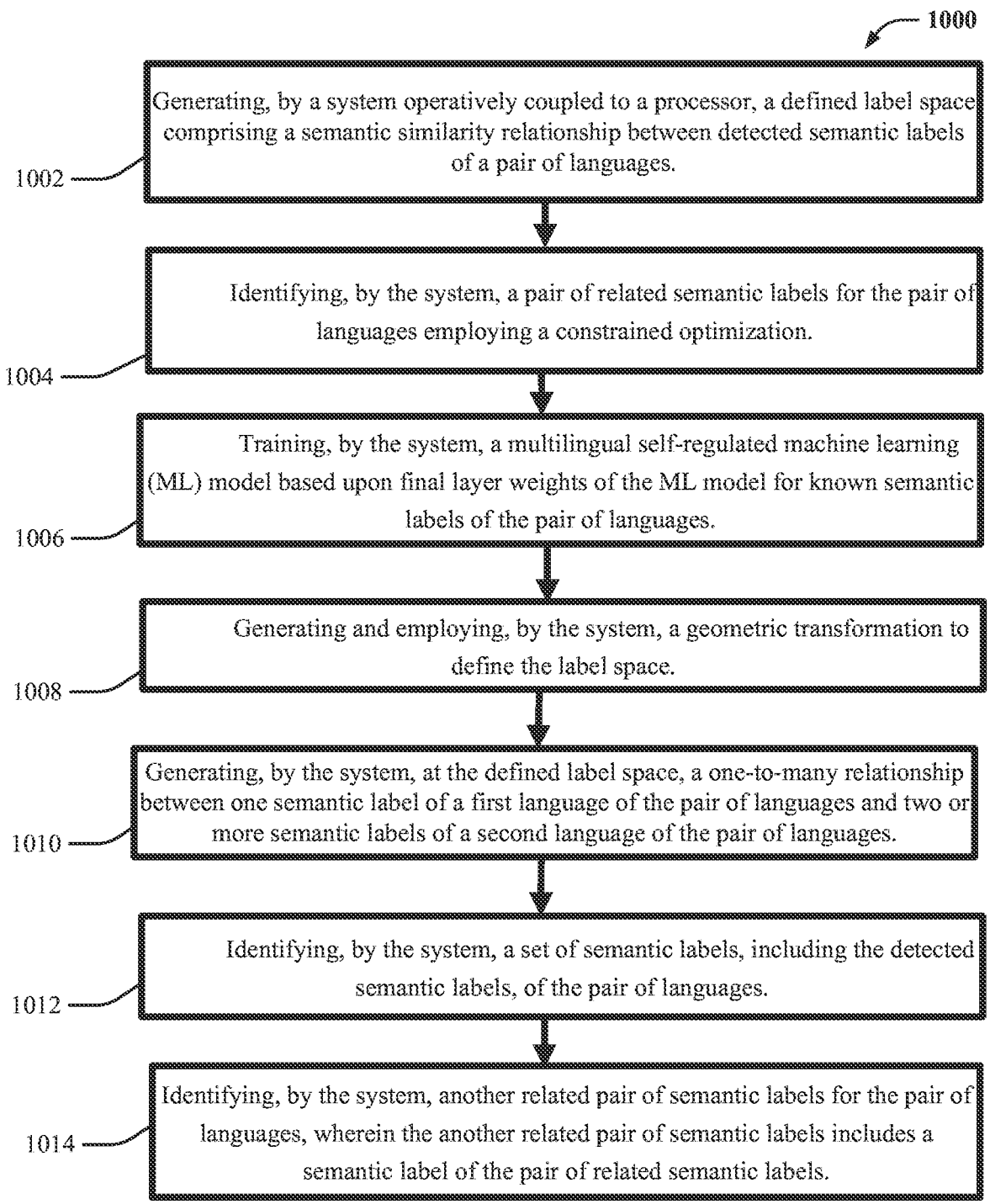
FIG. 10 illustrates a flow diagram of an example, non-limiting method that can facilitate semantic role labeling across two or more different languages, in accordance with one or more embodiments described herein.

Next, FIG. 10 illustrates a flow diagram of an example, non-limiting method 1000 that can facilitate determination of semantic relationships of arguments labels provided in two or more languages, in accordance with one or more embodiments described herein, such as the non-limiting 200 of FIG. 2. While the non-limiting method 1000 is described relative to the non-limiting system 200 of FIG. 2, the non-limiting method 1000 can be applicable also to other systems described herein, such as the non-limiting system 100 of FIG. 1. Repetitive description of like elements and/or processes employed in respective embodiments is omitted for sake of brevity.

At 1002, the non-limiting method 1000 can comprise generating, by a system operatively coupled to a processor (e.g., computation component 220), a defined label space comprising a semantic similarity relationship between detected semantic labels of a pair of languages.

At 1004, the non-limiting method 1000 can comprise identifying, by the system (e.g., analysis component 218), a pair of related semantic labels for the pair of languages employing a constrained optimization.

At 1006, the non-limiting method 1000 can comprise training, by the system (e.g., training component 214), a multilingual self-regulated machine learning (ML) model based upon final layer weights of the ML model for known semantic labels of the pair of languages.

At 1008, the non-limiting method 1000 can comprise generating and employing, by the system (e.g., computation component 220), a geometric transformation to define the label space.

At 1010, the non-limiting method 1000 can comprise generating, by the system (e.g., computation component 220), at the defined label space, a one-to-many relationship between one semantic label of a first language of the pair of languages and two or more semantic labels of a second language of the pair of languages.

At 1012, the non-limiting method 1000 can comprise identifying, by the system (e.g., determination component 210), a set of semantic labels, including the detected semantic labels, of the pair of languages.

At 1014, the non-limiting method 1000 can comprise identifying, by the system (e.g., analysis component 218), another related pair of semantic labels for the pair of languages, wherein the another related pair of semantic labels includes a semantic label of the pair of related semantic labels.

Figure 11:
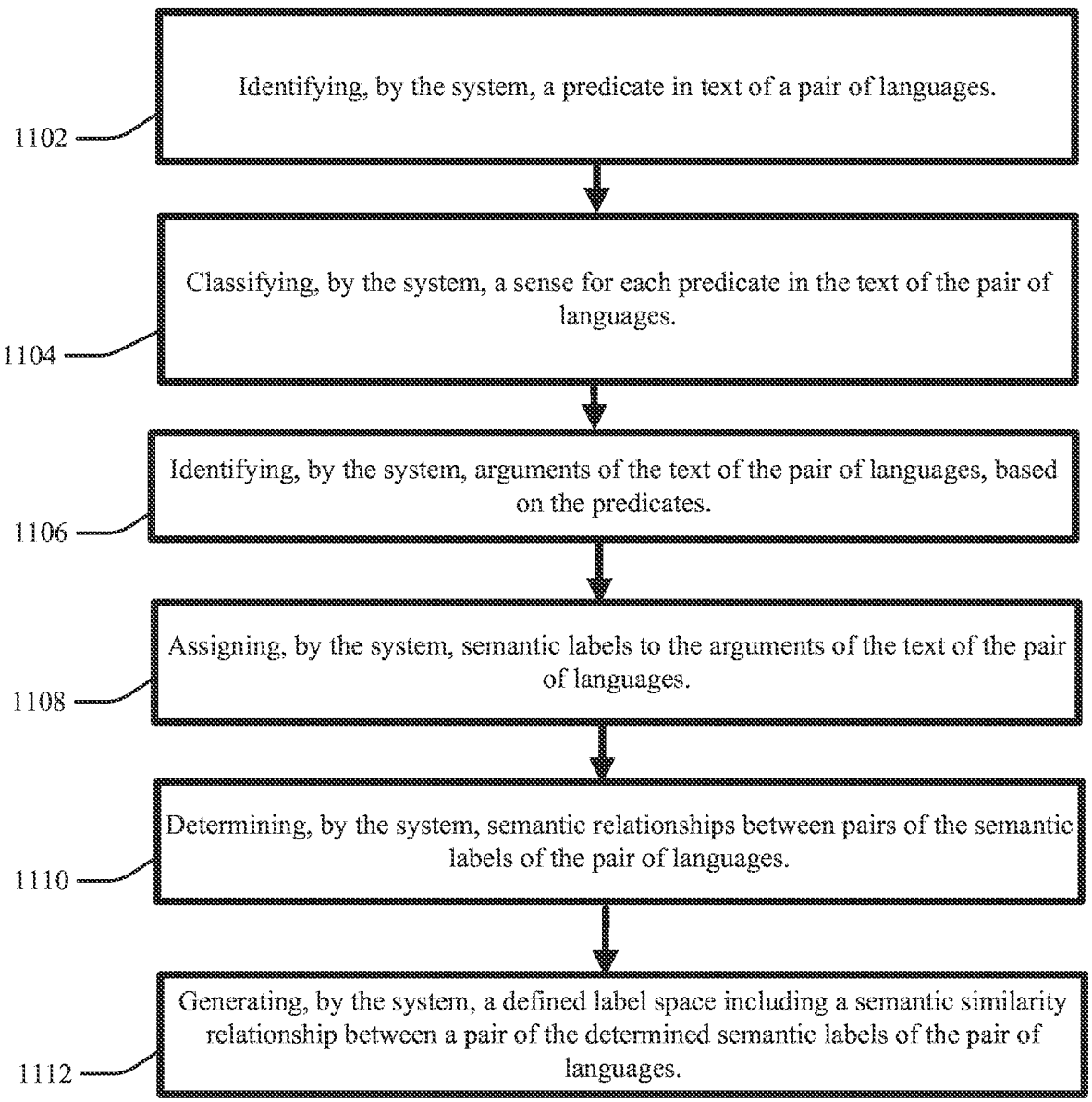
FIG. 11 illustrates a flow diagram of another example, non-limiting method that can facilitate semantic role labeling across two or more different languages, in accordance with one or more embodiments described herein.

Next, FIG. 11 illustrates a flow diagram of an example, non-limiting method 1100 that can facilitate determination of semantic relationships of arguments labels provided in two or more languages, in accordance with one or more embodiments described herein, such as the non-limiting 200 of FIG. 2. While the non-limiting method 1100 is described relative to the non-limiting system 200 of FIG. 2, the non-limiting method 1100 can be applicable also to other systems described herein, such as the non-limiting system 100 of FIG. 1. Repetitive description of like elements and/or processes employed in respective embodiments is omitted for sake of brevity.

At 1102, the non-limiting method 1100 can comprise identifying, by the system (e.g., analysis component 218), a predicate in text of a pair of languages.

At 1104, the non-limiting method 1100 can comprise classifying, by the system (e.g., analysis component 218), a sense for each predicate in the text of the pair of languages.

At 1106, the non-limiting method 1100 can comprise identifying, by the system (e.g., analysis component 218), arguments of the text of the pair of languages, based on the predicates.

At 1108, the non-limiting method 1100 can comprise assigning, by the system (e.g., analysis component 218), semantic labels to the arguments of the text of the pair of languages.

At 1110, the nonlimiting method 1100 can comprise determining, by the system (e.g., computation component 220), semantic relationships between pairs of the semantic labels of the pair of languages.

At 1112, the nonlimiting method 1100 can comprise generating, by the system (e.g., computation component 220), a defined label space including a semantic similarity relationship between a pair of the determined semantic labels of the pair of languages.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

In summary, one or more systems, devices, computer program products and/or computer-implemented methods of use provided herein relate to regularizing semantic similarity relationships relative to a pair of languages. A system can comprise a memory 104, 204 that stores computer executable components, and a processor 106, 206 that executes the computer executable components stored in the memory 104, 204, wherein the computer executable components can comprise a computation component 120, 220 that can generate a transformation $u_i$, $v_i$ comprising a semantic similarity relationship between detected semantic labels of a pair of languages.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

An advantage of the aforementioned systems, computer-implemented methods and/or computer program products can be ability to automatically detect relationships (similar, different and/or otherwise) between semantic labels of a pair of languages. As compared to existing technologies, similarity relationships can be detected and defined, as opposed to merely indicating that one or more semantic labels in different languages are different than one another. Custom labels can be learned, in one or more embodiments. The defined label space can be generated including varying levels of proximity between pairs of semantic labels, further defining the respective relationships, as opposed to mere absolute yes/no relationships. Further, the aforementioned process and operations can be employed for a pair of non-English languages.

A related advantage can be, depending on one or more parameters and/or specifications of the transformations trained and employed, an ability to automatically detect a similarity relationship between a pair of semantic labels of a pair of different languages, such as non-English languages. Indeed, in view of the one or more embodiments described herein, a practical application of the systems, computer-implemented methods and/or computer program products described herein can be a generated defined label space allowing for comparison between text in different languages, including non-English languages. Overall, such computerized tools can constitute a concrete and tangible technical improvement in the field of semantic role labeling (SRL).

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to semantic role labeling, as compared to existing systems and/or techniques. Systems, computer-implemented methods and/or computer program products facilitating performance of these processes are of great utility in the field of semantic role labeling and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively generate a defined label space having proximity designations for pairs of semantic labels as the one or more embodiments described herein can facilitate this process. And, neither can the human mind nor a human with pen and paper electronically generate a defined label space having proximity designations for pairs of semantic labels, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above.

One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing the one or more operations described herein.

Figure 12:
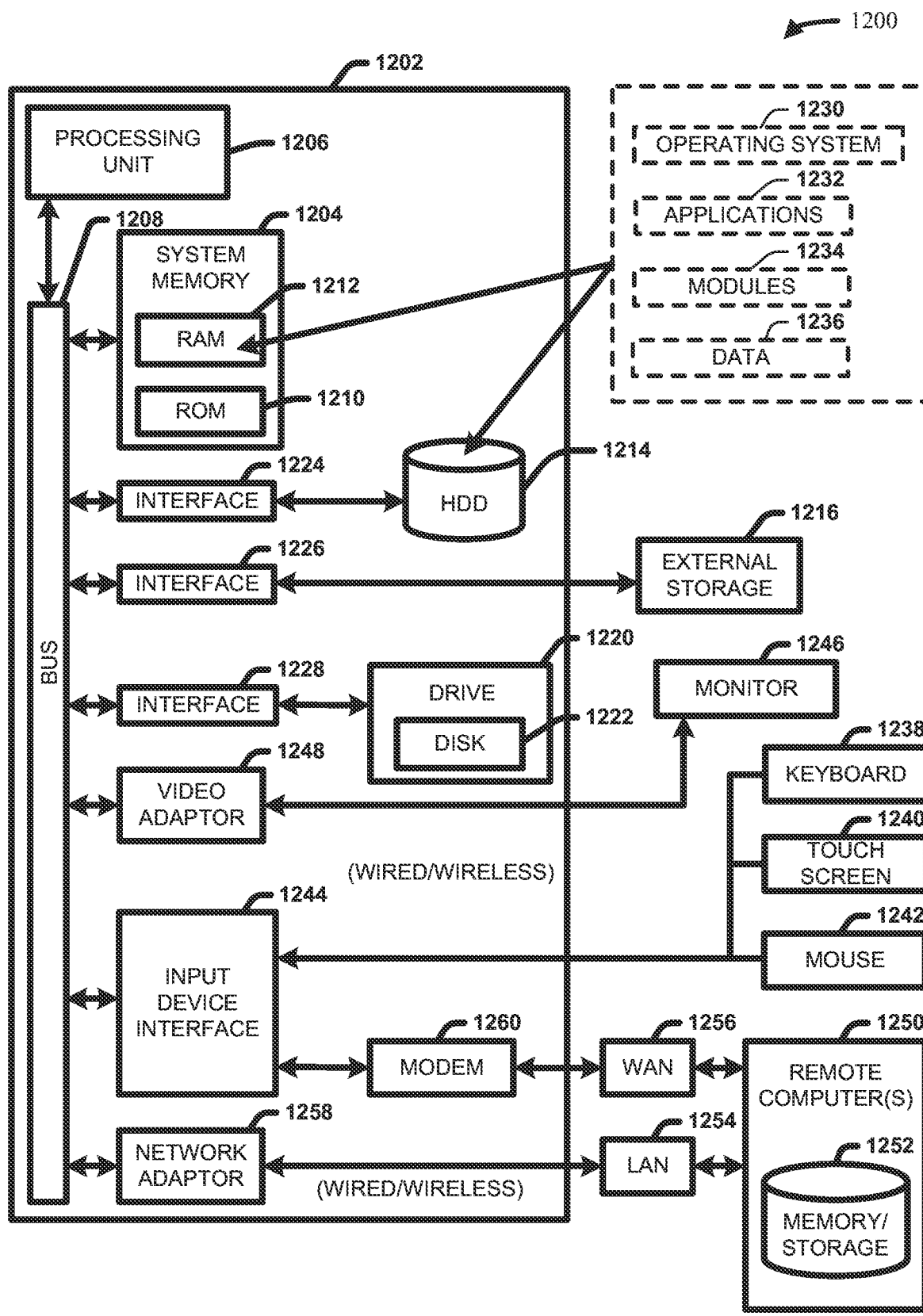
FIG. 12 illustrates a block diagram of an example, non-limiting, operating environment in which one or more embodiments described herein can be facilitated.
Figure 13:
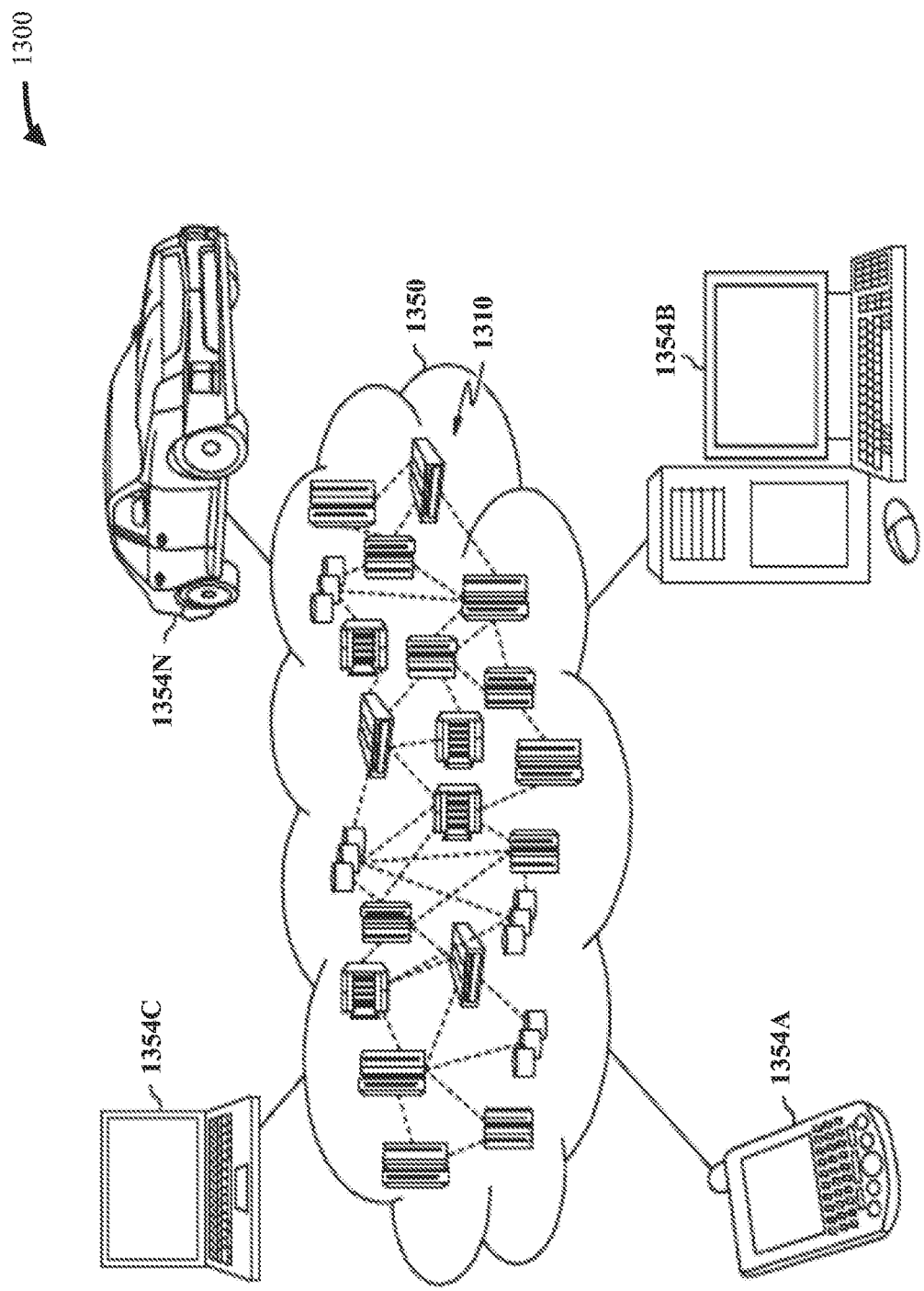
FIG. 13 illustrates a block diagram of an example, non-limiting, cloud computing environment in accordance with one or more embodiments described herein.
Figure 14:
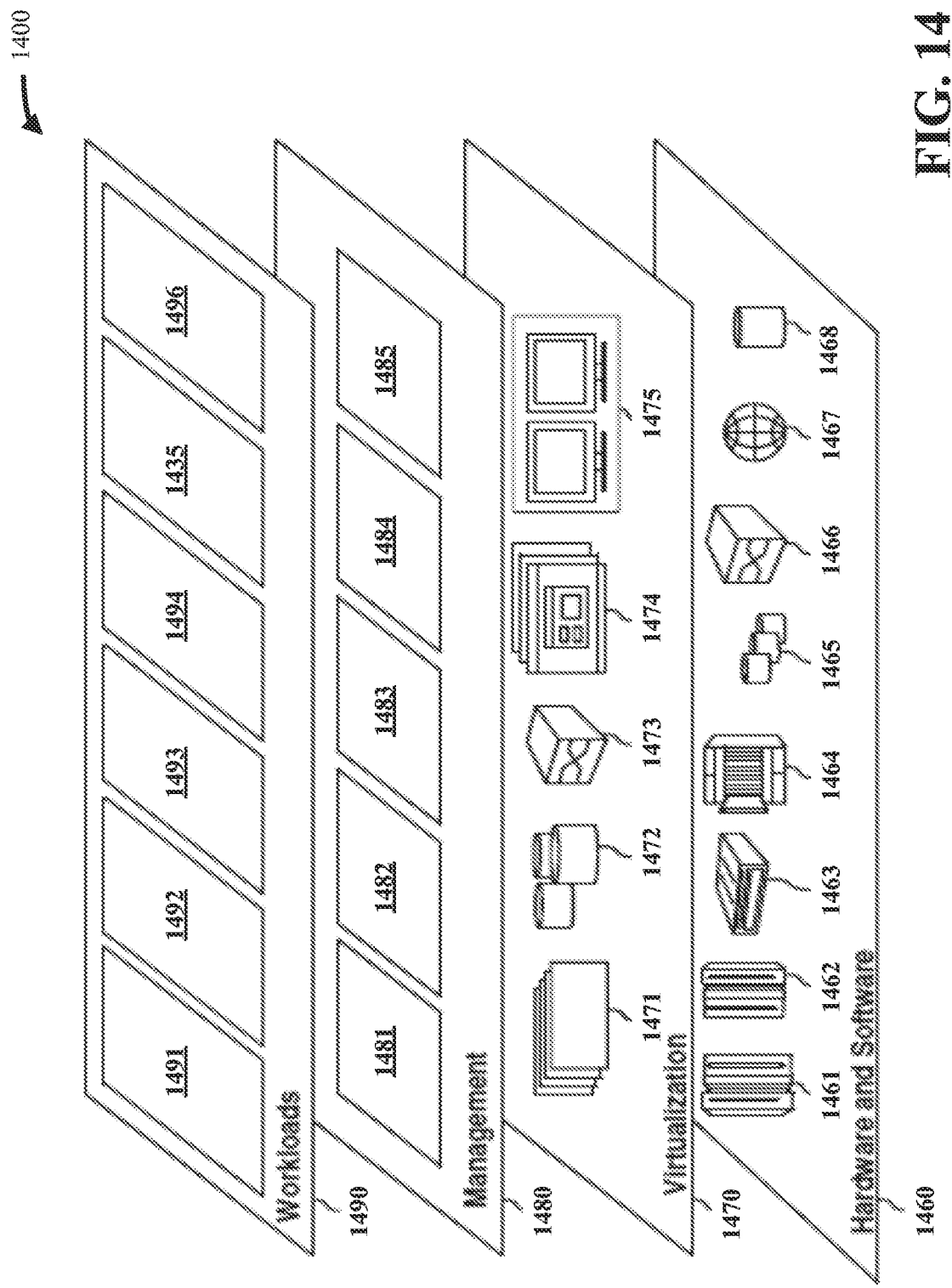
FIG. 14 illustrates a block diagram of example, non-limiting, abstraction model layers in accordance with one or more embodiments described herein.

Turning next to FIGS. 12-14, a detailed description is provided of additional context for the one or more embodiments described herein at FIGS. 1-11.

FIG. 12 and the following discussion are intended to provide a brief, general description of a suitable operating environment 1200 in which one or more embodiments described herein at FIGS. 1-11 can be implemented. For example, one or more components and/or other aspects of embodiments described herein can be implemented in or be associated with, such as accessible via, the operating environment 1200. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the aforedescribed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared and/or other wireless media.

With reference still to FIG. 12, the example operating environment 1200 for implementing one or more embodiments of the aspects described herein can include a computer 1202, the computer 1202 including a processing unit 1206, a system memory 1204 and/or a system bus 1208. One or more aspects of the processing unit 1206 can be applied to processors such as 106 of the non-limiting system 100. The processing unit 1206 can be implemented in combination with and/or alternatively to processors such as 106.

Memory 1204 can store one or more computer and/or machine readable, writable and/or executable components and/or instructions that, when executed by processing unit 1206 (e.g., a classical processor, a quantum processor and/or like processor), can facilitate performance of operations defined by the executable component(s) and/or instruction(s). For example, memory 1204 can store computer and/or machine readable, writable and/or executable components and/or instructions that, when executed by processing unit 1206, can facilitate execution of the one or more functions described herein relating to non-limiting system 100, as described herein with or without reference to the one or more figures of the one or more embodiments.

Memory 1204 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures.

Processing unit 1206 can comprise one or more types of processors and/or electronic circuitry (e.g., a classical processor, a quantum processor and/or like processor) that can implement one or more computer and/or machine readable, writable and/or executable components and/or instructions that can be stored at memory 1204. For example, processing unit 1206 can perform one or more operations that can be specified by computer and/or machine readable, writable and/or executable components and/or instructions including, but not limited to, logic, control, input/output (I/O), arithmetic and/or the like. In one or more embodiments, processing unit 1206 can be any of one or more commercially available processors. In one or more embodiments, processing unit 1206 can comprise one or more central processing unit, multi-core processor, microprocessor, dual microprocessors, microcontroller, System on a Chip (SOC), array processor, vector processor, quantum processor and/or another type of processor. The examples of processing unit 1206 can be employed to implement one or more embodiments described herein.

The system bus 1208 can couple system components including, but not limited to, the system memory 1204 to the processing unit 1206. The system bus 1208 can comprise one or more types of bus structure that can further interconnect to a memory bus (with or without a memory controller), a peripheral bus and/or a local bus using one or more of a variety of commercially available bus architectures. The system memory 1204 can include ROM 1210 and/or RAM 1212. A basic input/output system (BIOS) can be stored in a non-volatile memory such as ROM, erasable programmable read only memory (EPROM) and/or EEPROM, which BIOS contains the basic routines that help to transfer information among elements within the computer 1202, such as during startup. The RAM 1212 can include a high-speed RAM, such as static RAM for caching data.

The computer 1202 can include an internal hard disk drive (HDD) 1214 (e.g., EIDE, SATA), one or more external storage devices 1216 (e.g., a magnetic floppy disk drive (FDD), a memory stick or flash drive reader, a memory card reader and/or the like) and/or a drive 1220, e.g., such as a solid state drive or an optical disk drive, which can read or write from a disk 1222, such as a CD-ROM disc, a DVD, a BD and/or the like. Additionally, and/or alternatively, where a solid state drive is involved, disk 1222 could not be included, unless separate. While the internal HDD 1214 is illustrated as located within the computer 1202, the internal HDD 1214 can also be configured for external use in a suitable chassis (not shown). Additionally, while not shown in operating environment 1200, a solid state drive (SSD) can be used in addition to, or in place of, an HDD 1214. The HDD 1214, external storage device(s) 1216 and drive 1220 can be connected to the system bus 1208 by an HDD interface 1224, an external storage interface 1226 and a drive interface 1228, respectively. The HDD interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 1212, including an operating system 1230, one or more applications 1232, other program modules 1234 and/or program data 1236. All or portions of the operating system, applications, modules and/or data can also be cached in the RAM 1212. The systems and/or methods described herein can be implemented utilizing one or more commercially available operating systems and/or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In a related embodiment, operating system 1230 can comprise one virtual machine (VM) of multiple VMs hosted at computer 1202. Furthermore, operating system 1230 can provide runtime environments, such as the JAVA runtime environment or the .NET framework, for applications 1232. Runtime environments are consistent execution environments that can allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and/or settings for an application.

Further, computer 1202 can be enabled with a security module, such as a trusted processing module (TPM). For instance, with a TPM, boot components hash next in time boot components and wait for a match of results to secured values before loading a next boot component. This process can take place at any layer in the code execution stack of computer 1202, e.g., applied at application execution level and/or at operating system (OS) kernel level, thereby enabling security at any level of code execution.

An entity can enter and/or transmit commands and/or information into the computer 1202 through one or more wired/wireless input devices, e.g., a keyboard 1238, a touch screen 1240 and/or a pointing device, such as a mouse 1242. Other input devices (not shown) can include a microphone, an infrared (IR) remote control, a radio frequency (RF) remote control and/or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint and/or iris scanner, and/or the like. These and other input devices can be connected to the processing unit 1206 through an input device interface 1244 that can be coupled to the system bus 1208, but can be connected by other interfaces, such as a parallel port, an IEEE 1394 serial port, a game port, a USB port, an IR interface, a BLUETOOTH® interface and/or the like.

A monitor 1246 or other type of display device can be alternatively and/or additionally connected to the system bus 1208 via an interface, such as a video adapter 1248. In addition to the monitor 1246, a computer typically includes other peripheral output devices (not shown), such as speakers, printers and/or the like.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device and/or other common network node, and typically includes many or all of the elements described relative to the computer 1202, although, for purposes of brevity, only a memory/storage device 1252 is illustrated. Additionally, and/or alternatively, the computer 1202 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, one or more embodiments described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and/or software that facilitates communicating information among one or more embodiments described herein and external systems, sources and/or devices (e.g., computing devices, communication devices and/or the like).

The logical connections depicted include wired/wireless connectivity to a local area network (LAN) 1254 and/or larger networks, e.g., a wide area network (WAN) 1256. LAN and WAN networking environments can be commonplace in offices and companies and can facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired and/or wireless communication to the LAN 1254, which can also include a wireless access point (AP) disposed thereon for communicating with the adapter 1258 in a wireless mode.

When used in a WAN networking environment, the computer 1202 can include a modem 1260 and/or can be connected to a communications server on the WAN 1256 via other means for establishing communications over the WAN 1256, such as by way of the Internet. The modem 1260, which can be internal and/or external and a wired and/or wireless device, can be connected to the system bus 1208 via the input device interface 1244. In a networked environment, program modules depicted relative to the computer 1202 or portions thereof can be stored in the remote memory/storage device 1252. The network connections shown are merely exemplary and one or more other means of establishing a communications link among the computers can be used.

When used in either a LAN or WAN networking environment, the computer 1202 can access cloud storage systems or other network-based storage systems in addition to, and/or in place of, external storage devices 1216 as described above, such as but not limited to, a network virtual machine providing one or more aspects of storage and/or processing of information. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, such as with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices and/or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be employed relative to distributed computing environments (e.g., cloud computing environments), such as described below with respect to FIG. 13, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1350 described below with reference to FIG. 13, and/or with reference to the one or more functional abstraction layers (e.g., quantum software and/or the like) described below with reference to FIG. 14, to execute one or more operations in accordance with one or more embodiments described herein. For example, cloud computing environment 1350 and/or one or more of the functional abstraction layers 1460, 1470, 1480 and/or 1490 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by one or more embodiments described herein and/or components thereof to execute one or more operations in accordance with one or more embodiments described herein. For instance, one or more embodiments described herein and/or components thereof can employ such one or more classical and/or quantum computing resources to execute one or more classical and/or quantum: mathematical function, calculation and/or equation; computing and/or processing script; algorithm; model (e.g., artificial intelligence (AI) model, machine learning (ML) model and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and/or services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can specify location at a higher level of abstraction (e.g., country, state and/or datacenter).

Rapid elasticity: capabilities can be rapidly and elastically provisioned, in one or more cases automatically, to quickly scale out and rapidly released to quickly scale in. To the consumer, the capabilities available for provisioning can appear to be unlimited and can be purchased in any quantity at any time.

Measured service: cloud systems automatically control and optimize resource use by leveraging a metering capability at one or more levels of abstraction appropriate to the type of service (e.g., storage, processing, bandwidth and/or active user accounts). Resource usage can be monitored, controlled and/or reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage and/or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems and/or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the non-limiting system 100 and/or the example operating environment 800 can be associated with and/or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting system 100 and/or example operating environment 800 can be employed to use hardware and/or software to solve problems that are highly technical in nature, that are not abstract and/or that cannot be performed as a set of mental acts by a human.

Referring now to details of one or more aspects illustrated at FIG. 13, the illustrative cloud computing environment 1350 is depicted. As shown, cloud computing environment 1350 includes one or more cloud computing nodes 1310 with which local computing devices used by cloud consumers, such as, for example, personal digital assistant (PDA) or cellular telephone 1354A, desktop computer 1354B, laptop computer 1354C and/or automobile computer system 1354N can communicate. Although not illustrated in FIG. 13, cloud computing nodes 1310 can further comprise a quantum platform (e.g., quantum computer, quantum hardware, quantum software and/or the like) with which local computing devices used by cloud consumers can communicate. Cloud computing nodes 1310 can communicate with one another. They can be grouped (not shown) physically or virtually, in one or more networks, such as Private, Community, Public, or Hybrid clouds as described hereinabove, or a combination thereof. This allows cloud computing environment 1350 to offer infrastructure, platforms and/or software as services for which a cloud consumer does not need to maintain resources on a local computing device. It is understood that the types of computing devices 1354A-N shown in FIG. 13 are intended to be illustrative only and that cloud computing nodes 1310 and cloud computing environment 1350 can communicate with any type of computerized device over any type of network and/or network addressable connection (e.g., using a web browser).

Referring now to details of one or more aspects illustrated at FIG. 14, a set 1400 of functional abstraction layers is shown, such as provided by cloud computing environment 1350 (FIG. 13). One or more embodiments described herein can be associated with, such as accessible via, one or more functional abstraction layers described below with reference to FIG. 14 (e.g., hardware and software layer 1460, virtualization layer 1470, management layer 1480 and/or workloads layer 1490). It should be understood in advance that the components, layers and/or functions shown in FIG. 14 are intended to be illustrative only and embodiments described herein are not limited thereto. As depicted, the following layers and/or corresponding functions are provided:

Hardware and software layer 1460 can include hardware and software components. Examples of hardware components include: mainframes 1461; RISC (Reduced Instruction Set Computer) architecture-based servers 1462; servers 1463; blade servers 1464; storage devices 1465; and/or networks and/or networking components 1466. In one or more embodiments, software components can include network application server software 1467, quantum platform routing software 1468; and/or quantum software (not illustrated in FIG. 14).

Virtualization layer 1470 can provide an abstraction layer from which the following examples of virtual entities can be provided: virtual servers 1471; virtual storage 1472; virtual networks 1473, including virtual private networks; virtual applications and/or operating systems 1474; and/or virtual clients 1475.

In one example, management layer 1480 can provide the functions described below. Resource provisioning 1481 can provide dynamic procurement of computing resources and other resources that can be utilized to perform tasks within the cloud computing environment. Metering and Pricing 1482 can provide cost tracking as resources are utilized within the cloud computing environment, and/or billing and/or invoicing for consumption of these resources. In one example, these resources can include one or more application software licenses. Security can provide identity verification for cloud consumers and/or tasks, as well as protection for data and/or other resources. User (or entity) portal 1483 can provide access to the cloud computing environment for consumers and system administrators. Service level management 1484 can provide cloud computing resource allocation and/or management such that required service levels are met. Service Level Agreement (SLA) planning and fulfillment 1485 can provide pre-arrangement for, and procurement of, cloud computing resources for which a future requirement is anticipated in accordance with an SLA.

Workloads layer 1490 can provide examples of functionality for which the cloud computing environment can be utilized. Non-limiting examples of workloads and functions which can be provided from this layer include: mapping and navigation 1491; software development and lifecycle management 1492; virtual classroom education delivery 1493; data analytics processing 1494; transaction processing 1495; and/or application transformation software 1496.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures and/or the like that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," "data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
   a memory that stores computer executable components; and
   a processor that executes the computer executable components stored in the memory, wherein the computer executable components comprise:
      a computation component that generates, using a machine learning model, a defined label space comprising semantic relationships between detected semantic labels of a pair of languages, wherein the generating comprises:
         obtaining a first label set comprising first sematic labels assigned to first arguments associated with first predicates in first sentences of one or more first documents in a first language of the pair of languages,
         obtaining a second label set comprising second sematic labels assigned to second arguments associated with second predicates in second sentences of one or more second documents in a second language of the pair of languages,
         determining semantic label pairs between the first sematic labels and the second semantic labels,
         assigning semantic relationship types to the semantic label pairs,
         generating a transformation based on the semantic relationship types assigned to the semantic label pairs, and
         generating the defined label space based on the transformation.

2. The system of claim 1, wherein the generating further comprises:
   identifying the first predicates in the first sentences of one or more first documents in the first language;
   identifying the first arguments in the first sentences based on the first predicates; and
   assigning the first sematic labels to the first arguments.

3. The system of claim 1, further comprises:
   a training component that trains the machine learning model based upon final layer weights of the machine learning model for known semantic labels of the pair of languages.

4. The system of claim 1, wherein the generating further comprises:
   identifying the second predicates in the second sentences of one or more second documents in the second language;
   identifying the second arguments in the second sentences based on the second predicates; and
   assigning the second sematic labels to the second arguments.

5. The system of claim 1, wherein the defined label space comprises a one-to-many relationship between one semantic label of the first language and two or more semantic labels of the second language.

6. The system of claim 1, wherein the transformation provides for back-and-forth projection between the pair of languages.

7. The system of claim 1, wherein the semantic relationship types are selected from a group of types comprising a similarity relationship, a difference relationship, a no-correspondence relationship, and a probable relationship.

8. A computer-implemented method, comprising:
   generating, by a system operatively coupled to a processor, using a machine learning model, a defined label space comprising semantic relationships between detected semantic labels of a pair of languages, wherein the generating comprises:
      obtaining a first label set comprising first sematic labels assigned to first arguments associated with first predicates in first sentences of one or more first documents in a first language of the pair of languages,
      obtaining a second label set comprising second sematic labels assigned to second arguments associated with second predicates in second sentences of one or more second documents in a second language of the pair of languages,
      determining semantic label pairs between the first sematic labels and the second semantic labels,
      assigning semantic relationship types to the semantic label pairs,
      generating a transformation based on the semantic relationship types assigned to the semantic label pairs, and
      generating the defined label space based on the transformation.

9. The computer-implemented method of claim 8, wherein the generating further comprises:
   identifying the first predicates in the first sentences of one or more first documents in the first language;
   identifying the first arguments in the first sentences based on the first predicates; and
   assigning the first sematic labels to the first arguments.

10. The computer-implemented method of claim 8, further comprising:
    training, by the system, the machine learning model based upon final layer weights of the machine learning model for known semantic labels of the pair of languages.

11. The computer-implemented method of claim 8, wherein the generating further comprises
    identifying the second predicates in the second sentences of one or more second documents in the second language;

identifying the second arguments in the second sentences based on the second predicates; and assigning the second sematic labels to the second arguments.

12. The computer-implemented method of claim 8, wherein the defined label space comprises a one-to-many relationship between one semantic label of the first language and two or more semantic labels of the second language.

13. The computer-implemented method of claim 8, wherein the transformation provides for back-and-forth projection between the pair of languages.

14. The computer-implemented method of claim 8, wherein the semantic relationship types are selected from a group of types comprising a similarity relationship, a difference relationship, a no-correspondence relationship, and a probable relationship.

15. A computer program product facilitating generation of a multi-language label space, the computer program product comprising a non-transitory computer readable medium having program instructions embodied therewith, the program instructions executable by a processor to cause the processor to:

generate, by the processor, using a machine learning model, a defined label space comprising semantic relationships between detected semantic labels of a pair of languages, wherein the generating comprises:

obtaining a first label set comprising first sematic labels assigned to first arguments associated with first predicates in first sentences of one or more first documents in a first language of the pair of languages, obtaining a second label set comprising second sematic labels assigned to second arguments associated with second predicates in second sentences of one or more second documents in a second language of the pair of languages, determining semantic label pairs between the first sematic labels and the second semantic labels, assigning semantic relationship types to the semantic label pairs, generating a transformation based on the semantic relationship types assigned to the semantic label pairs, and generating the defined label space based on the transformation.

16. The computer program product of claim 15, wherein the generating further comprises:

identifying the first predicates in the first sentences of one or more first documents in the first language;

identifying the first arguments in the first sentences based on the first predicates; and assigning the first sematic labels to the first arguments.

17. The computer program product of claim 15, wherein the program instructions are further executable by the processor to cause the processor to:

train, by the processor, the machine learning model based upon final layer weights of the machine learning model for known semantic labels of the pair of languages.

18. The computer program product of claim 15, wherein the generating further comprises:

identifying the second predicates in the second sentences of one or more second documents in the second language;

identifying the second arguments in the second sentences based on the second predicates; and assigning the second sematic labels to the second arguments.

19. The computer program product of claim 15, wherein the defined label space comprises a one-to-many relationship between one semantic label of the first language and two or more semantic labels of the second language.

20. The computer program product of claim 15, wherein the transformation provides for back-and-forth projection between the pair of languages.

\* \* \* \* \*